(12) United States Patent
Sakurai

(10) Patent No.: US 11,762,259 B2
(45) Date of Patent: Sep. 19, 2023

(54) LASER BEAM OUTPUT APPARATUS

(71) Applicant: ADVANTEST Corporation, Tokyo (JP)

(72) Inventor: Takao Sakurai, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 17/517,981

(22) Filed: Nov. 3, 2021

(65) Prior Publication Data

US 2022/0171254 A1 Jun. 2, 2022

(30) Foreign Application Priority Data

Nov. 27, 2020 (JP) ................. 2020-197105

(51) Int. Cl.
*G02F 1/295* (2006.01)
*G02F 1/355* (2006.01)
*G02F 1/39* (2006.01)
*G02F 1/33* (2006.01)

(52) U.S. Cl.
CPC .............. *G02F 1/295* (2013.01); *G02F 1/33* (2013.01); *G02F 1/3551* (2013.01); *G02F 1/3558* (2013.01); *G02F 1/39* (2013.01); *G02F 2202/20* (2013.01)

(58) Field of Classification Search
None
See application file for complete search history.

(56) References Cited

U.S. PATENT DOCUMENTS

2015/0316832 A1   11/2015   Sato
2020/0310220 A1*  10/2020   Sakurai ................. G02F 1/3551

FOREIGN PATENT DOCUMENTS

| CN | 107957276 B | * 7/2019 | ......... G01D 5/35329 |
| JP | 2004-29152  |   1/2004 | |
| JP | 2007-273435 |  10/2007 | |
| JP | 2010-256784 |  11/2010 | |
| JP | 2010-286672 |  12/2010 | |
| JP | 2015-222414 |  12/2015 | |
| JP | 2020-166235 |  10/2020 | |

* cited by examiner

*Primary Examiner* — Christopher Stanford
*Assistant Examiner* — Journey F Sumlar
(74) *Attorney, Agent, or Firm* — GREENBLUM & BERNSTEIN, P.L.C.

(57) ABSTRACT

According to the present invention, a pulsed laser output section outputs a laser beam having a predetermined wavelength as first pulses. An optical path determining section receives the first pulses and determines one or more among two or more optical paths for each of the first pulses for output. A wavelength changing section receives light beams travelling, respectively, through the two or more optical paths and, when the power of the traveling light beams exceeds a threshold value, changes the light beams to have their respective different wavelengths for output. A multiplexer multiplexes outputs from the wavelength changing section. The optical path determining section allows for change in the power ratio between a first power of the light beam traveling through one of two among the two or more optical paths and a second power of the light beam traveling through the other of the two optical paths.

16 Claims, 21 Drawing Sheets

LASER BEAM OUTPUT APPARATUS

BACKGROUND OF THE INVENTION

Field of the Invention

The present invention relates to outputting laser pulsed light of multiple wavelengths.

Description of the Related Art

There has conventionally been known a laser beam output apparatus for irradiation with pulsed light of one wavelength and immediately thereafter pulsed light of another wavelength (see Japanese Patent Application Publication No. 2020-166235).

It is noted that Japanese Patent Application Publication Nos. 2010-286672 and 2010-256784 disclose variable optical attenuators (VOAs), Japanese Patent Application Publication Nos. 2015-222414 and 2004-029152 disclose multiple optical paths, and Japanese Patent Application Publication No. 2007-273435 discloses applying electric current to a light emitting device, though having no direct implication with such a laser beam output apparatus as described above.

SUMMARY OF THE INVENTION

Here, in such related-art laser beam output apparatuses, the laser beam output may fluctuate due to, for example, time-dependent fluctuation and ambient temperature dependency in the pumping laser output as well as time-dependent change in the PPLN conversion efficiency (photorefractive effect).

It is hence an object of the present invention to provide for output adjustment in a laser beam output apparatus.

According to one aspect of the present invention, a laser beam output apparatus includes: a pulsed laser output section that outputs a laser beam having a predetermined wavelength as first pulses; an optical path determining section that receives the first pulses and determines one or more among two or more optical paths for each of the first pulses for output; a wavelength changing section that receives light beams travelling, respectively, through the two or more optical paths and, when the power of the traveling light beams exceeds a threshold value, changes the light beams to have their respective different wavelengths for output; and a multiplexer that multiplexes outputs from the wavelength changing section, wherein the optical path determining section is arranged to allow for change in the power ratio between a first power of the light beam traveling through one of two among the two or more optical paths and a second power of the light beam traveling through the other of the two optical paths.

According to the thus constructed laser beam output apparatus, a pulsed laser output section outputs a laser beam having a predetermined wavelength as first pulses. An optical path determining section receives the first pulses and determines one or more among two or more optical paths for each of the first pulses for output. A wavelength changing section receives light beams travelling, respectively, through the two or more optical paths and, when the power of the traveling light beams exceeds a threshold value, changes the light beams to have their respective different wavelengths for output. A multiplexer multiplexes outputs from the wavelength changing section. Furthermore, the optical path determining section is arranged to allow for change in the power ratio between a first power of the light beam traveling through one of two among the two or more optical paths and a second power of the light beam traveling through the other of the two optical paths.

According to another aspect of the present invention, a laser beam output apparatus includes: a pulsed laser output section that outputs a laser beam having a predetermined wavelength as first pulses; an optical path determining section that receives the first pulses and determines one or more among two or more optical paths for each of the first pulses for output; a parallelizing section that parallelizes the traveling direction of light beams traveling, respectively, through the two or more optical paths; a wavelength changing section that receives outputs from the parallelizing section and, when the power of the outputs exceeds a threshold value, changes the outputs to have their respective different wavelengths for output; a focusing section that receives and focuses outputs from the wavelength changing section; and an optical fiber that receives an output from the focusing section at a core end face, wherein the focusing section is arranged to focus the outputs from the wavelength changing section on the core end face, and the optical path determining section is arranged to allow for change in the power ratio between a first power of the light beam traveling through one of two among the two or more optical paths and a second power of the light beam traveling through the other of the two optical paths.

According to the thus constructed laser beam output apparatus, a pulsed laser output section outputs a laser beam having a predetermined wavelength as first pulses. An optical path determining section receives the first pulses and determines one or more among two or more optical paths for each of the first pulses for output. A parallelizing section parallelizes the traveling direction of light beams traveling, respectively, through the two or more optical paths. A wavelength changing section receives outputs from the parallelizing section and, when the power of the outputs exceeds a threshold value, changes the outputs to have their respective different wavelengths for output. A focusing section receives and focuses outputs from the wavelength changing section. An optical fiber receives an output from the focusing section at a core end face. The focusing section is arranged to focus the outputs from the wavelength changing section on the core end face, and the optical path determining section is arranged to allow for change in the power ratio between a first power of the light beam traveling through one of two among the two or more optical paths and a second power of the light beam traveling through the other of the two optical paths.

According to the laser beam output apparatus of the present invention, the optical path determining section may be arranged such that: the power of the light beam traveling through any one of the optical paths only exceeds the threshold value; when the first power exceeds the threshold value, the power ratio is allowed to have two or more levels; and when the second power also exceeds the threshold value, the power ratio is allowed to have two or more levels.

According to the laser beam output apparatus of the present invention, the threshold value may be defined for each of the optical paths.

According to the laser beam output apparatus of the present invention, the optical path determining section may include a power ratio change signal providing section that provides a power ratio change signal for changing the power ratio, and the optical path determining section is an acousto-optical modulator.

According to the laser beam output apparatus of the present invention, the power ratio change signal providing section may have: a carrier wave source that outputs a carrier wave; a mixer that mixes the carrier wave and a voltage-variable modulation signal to output a modulated signal; and an amplitude changer that changes the amplitude of the modulated signal to output the power ratio change signal.

According to the present invention, the laser beam output apparatus may further include an output measuring section that measures the output of the wavelength changing section, wherein the power ratio change signal providing section is arranged to change the magnitude of the power ratio change signal based on a result of measurement by the output measuring section.

According to the laser beam output apparatus of the present invention, the optical path determining section may be an acousto-optical modulator, and the two optical paths may be 0-order and 1-order optical paths of the acousto-optical modulator.

According to the laser beam output apparatus of the present invention, the wavelength changing section may be a PPLN.

According to the laser beam output apparatus of the present invention, the wavelength changing section may be an OPO or an OPG.

DESCRIPTION OF THE PREFERRED EMBODIMENTS

Preferred embodiments of the present invention will hereinafter be described with reference to the accompanying drawings.

First Embodiment

Figure 1:
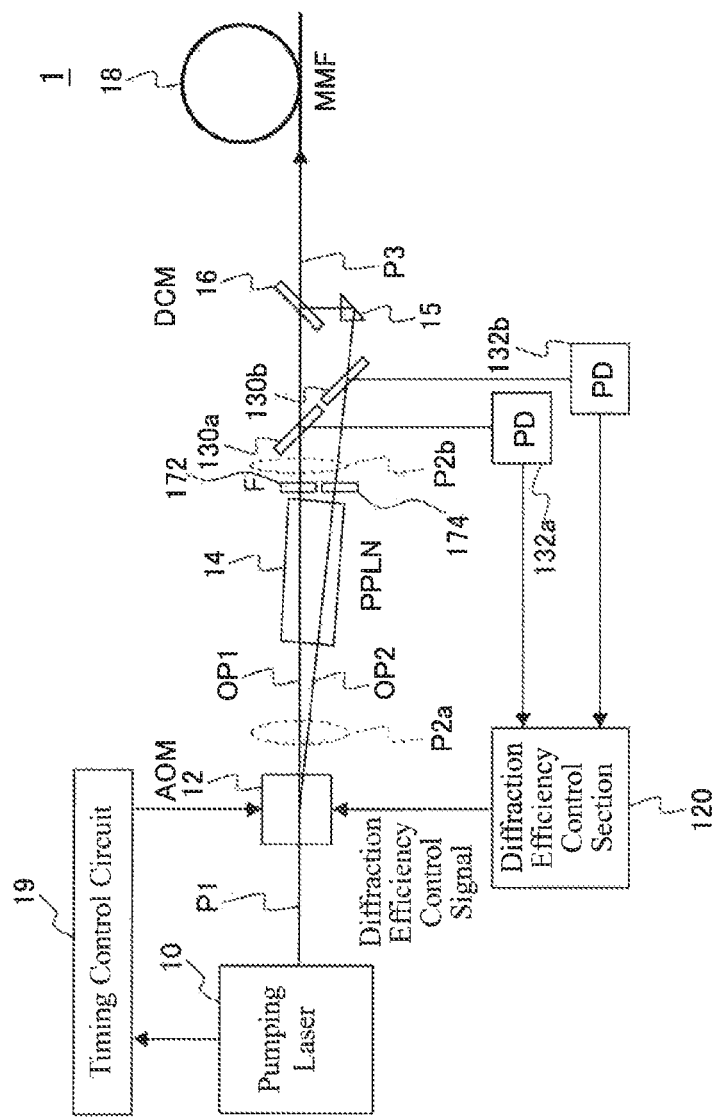
FIG. 1 shows a configuration of a laser beam output apparatus 1 according to a first embodiment.
Figure 2:
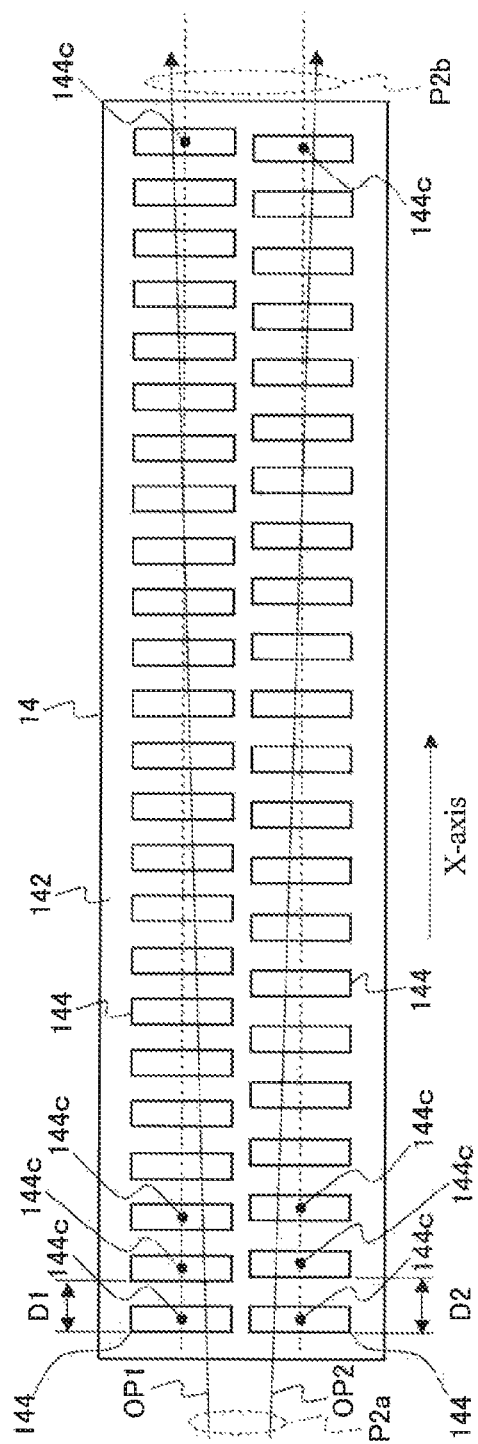
FIG. 2 is a plan view of a wavelength changing section 14 according to the first embodiment.
Figure 3:
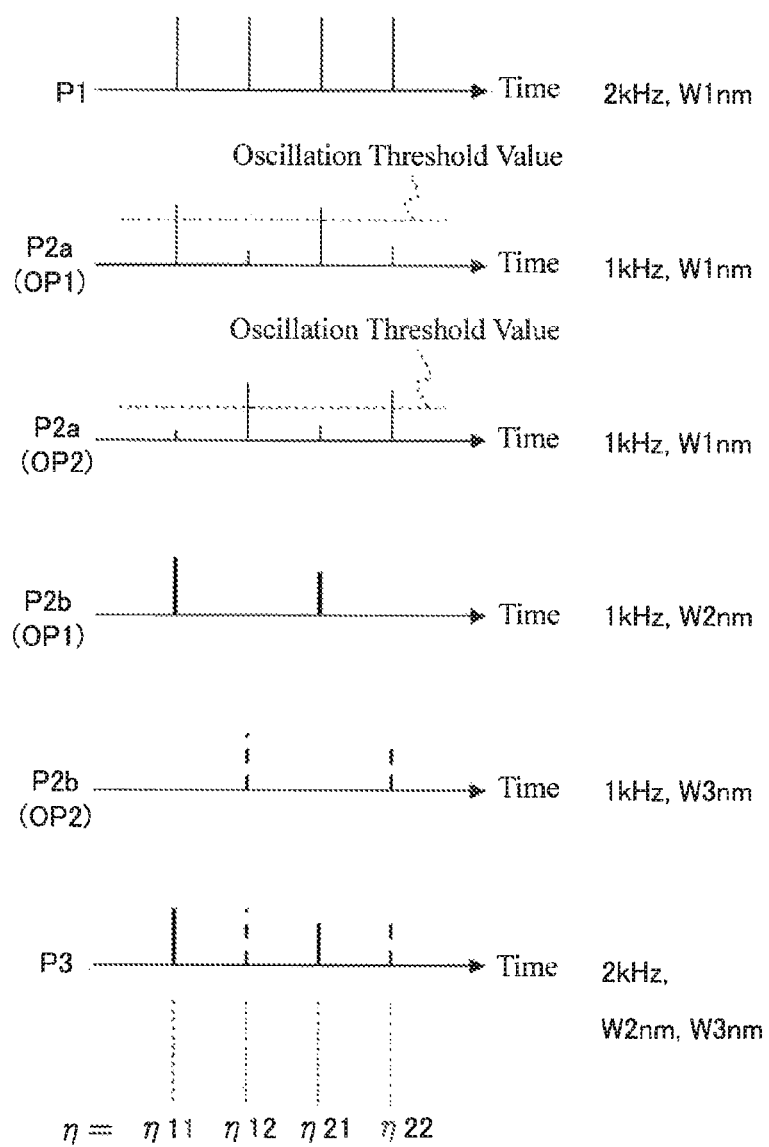
FIG. 3 shows timing charts of first pulses P1, second pulses (before wavelength conversion) P2a, second pulses (after wavelength conversion) P2b, and third pulses P3 according to the first embodiment.

FIG. 1 shows a configuration of a laser beam output apparatus 1 according to a first embodiment. FIG. 2 is a plan view of a wavelength changing section 14 according to the first embodiment. FIG. 3 shows timing charts of first pulses P1, second pulses (before wavelength conversion) P2a, second pulses (after wavelength conversion) P2b, and third pulses P3 according to the first embodiment. It is noted that in FIG. 3, the thickness and type (solid or broken) of lines indicating the pulses vary depending on the wavelength.

The laser beam output apparatus 1 according to the first embodiment includes a pumping laser (pulsed laser output section) 10, an acousto-optical modulator (optical path determining section) (AOM) 12, a wavelength changing section (PPLN) 14, a mirror 15, a dichroic mirror (multiplexer) (DCM) 16, filters (F) 172, 174, an optical fiber (MMF) 18, a timing control circuit (timing control section) 19, a diffraction efficiency control section (power ratio change signal providing section) 120, half mirrors 130a, 130b, and photodiodes (output measuring sections) (PD) 132a, 132b.

The pumping laser (pulsed laser output section) 10 is arranged to output a laser beam having a predetermined wavelength W1 [nm] as first pulses P1 having a predetermined frequency (e.g. 2 kHz) (see FIG. 3). The pumping laser 10 is, for example, a Yb:YAG laser.

The acousto-optical modulator (optical path determining section) (AOM) 12 is arranged to receive the first pulses P1 and determine one or more among the two optical paths OP1, OP2 for each of the first pulses P1 for output. It is noted that the two optical paths OP1, OP2 are, respectively, 0-order and 1-order optical paths of the acousto-optical modulator 12. When the diffraction efficiency η of the acousto-optical modulator 12 is 0, the first pulses P1 travel only through the optical path OP1. When the diffraction efficiency η exceeds 0, the first pulses P1 travel through the optical paths OP1 and OP2. Given that the power of the first pulses P1 received by the acousto-optical modulator 12 is designated by I, pulses with the power I·(1−η) travel through the optical path OP1, while pulses with the power I·η travel through the optical path OP2.

The acousto-optical modulator (optical path determining section) (AOM) 12 is thus arranged to allow for change in the power ratio (1−η:η) between the first power I·(1−η) of the light beam traveling through one (OP1) of the two optical paths OP1, OP2 and the second power I·η of the light beam traveling through the other (OP2) of the two optical paths OP1, OP2. It is noted that the traveling light beam means light traveling through each of the two optical paths OP1, OP2.

The acousto-optical modulator 12 is provided with a diffraction efficiency control signal from the diffraction efficiency control section (power ratio change signal providing section) 120. The diffraction efficiency η varies according to the power P of the diffraction efficiency control signal. The power P of the diffraction efficiency control signal is within the range from 0 to Pmax. The diffraction efficiency control signal is provided as an acoustic wave, which is converted from an electrical signal by a transducer not shown, to the acousto-optical modulator 12.

Figure 6:
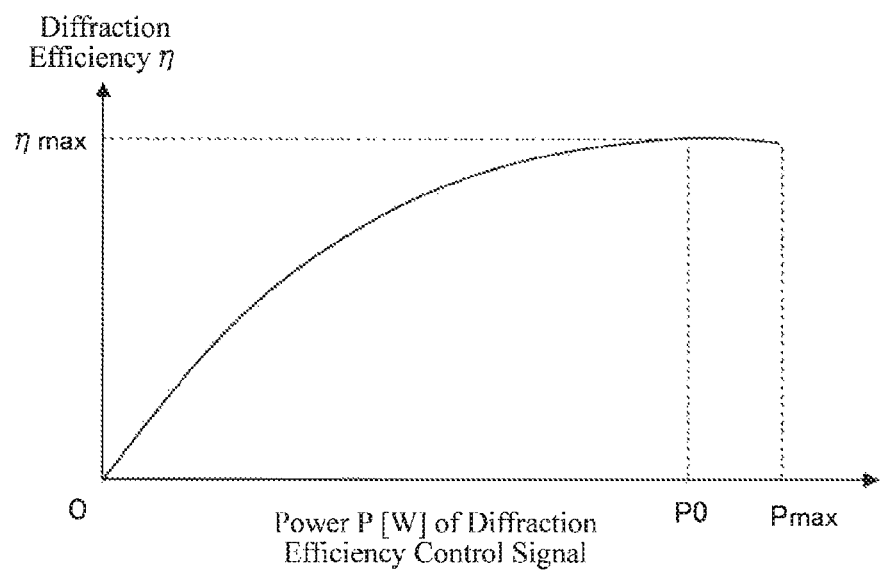
FIG. 6 shows a relationship between the power P of the diffraction efficiency control signal and the diffraction efficiency $\eta$.

FIG. 6 shows a relationship between the power P of the diffraction efficiency control signal and the diffraction efficiency η. When the power P of the diffraction efficiency control signal is 0 [W], the diffraction efficiency η=0. For 0<P<P0, the diffraction efficiency η monotonically increases. When P=P0, η has its maximum value ηmax. For P0<P<Pmax, the diffraction efficiency η monotonically decreases.

Figure 15:
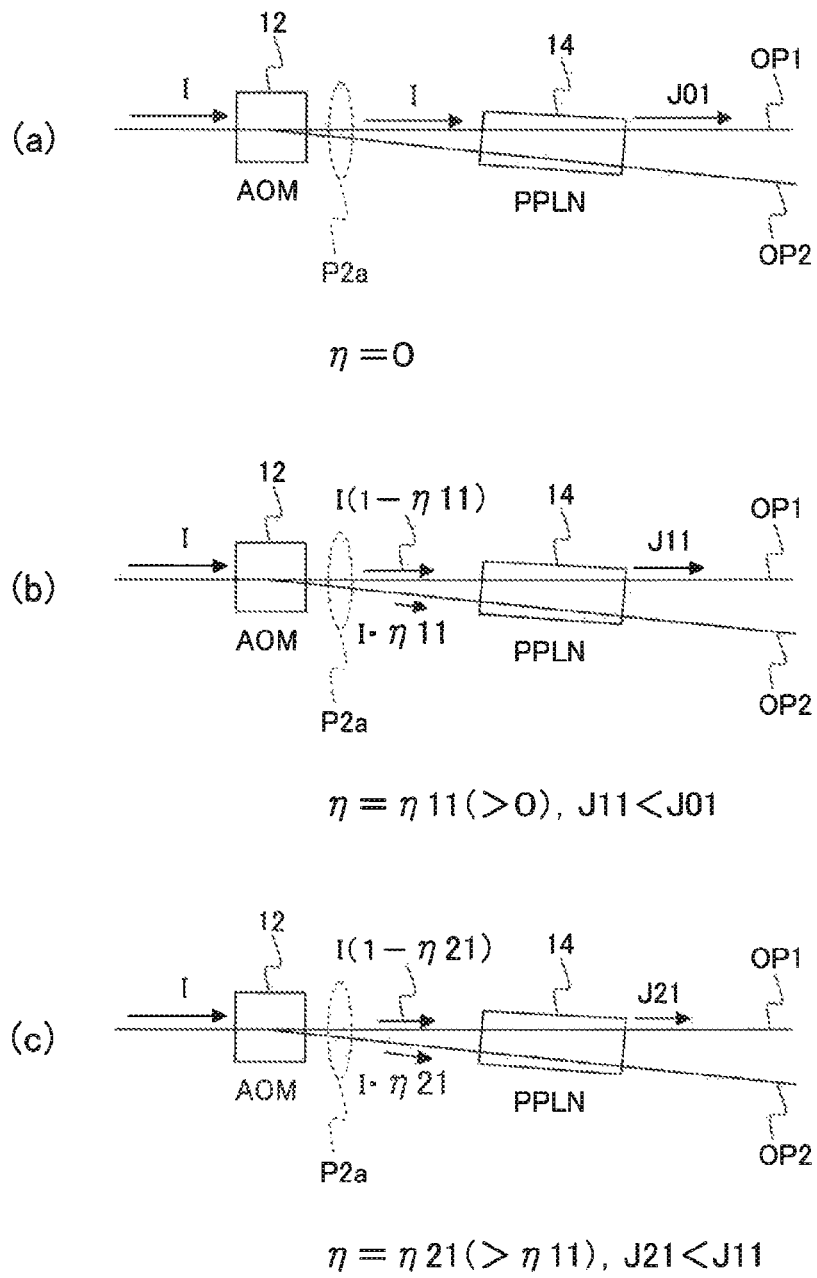
FIG. 15 shows the first power $I \cdot (1-\eta)$ and the second power $I \cdot \eta$ when the output from the wavelength changing section (PPLN) 14 is outputted through the optical path OP1.
Figure 16:
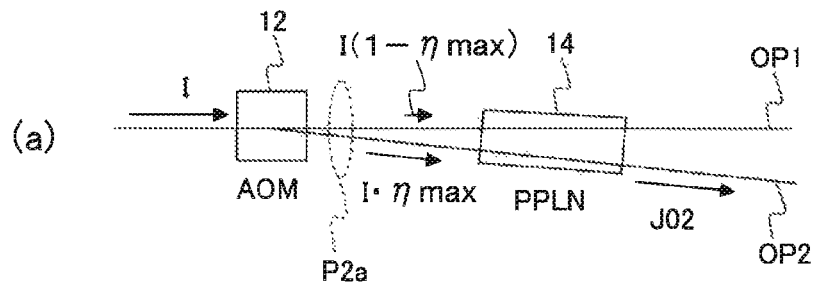
FIG. 16 shows the first power $I \cdot (1-\eta)$ and the second power $I \cdot \eta$ when the output from the wavelength changing section (PPLN) 14 is outputted through the optical path OP2.
Figure 16:
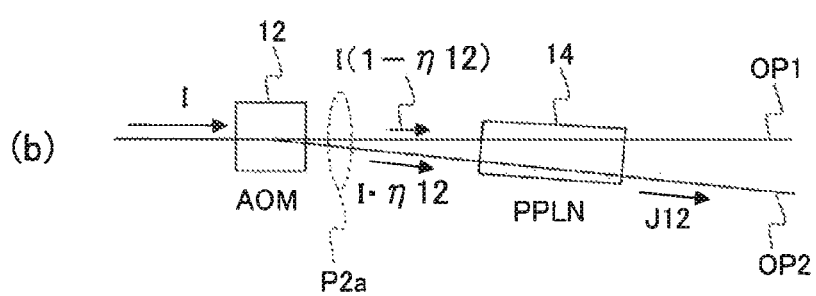
Figure 16:
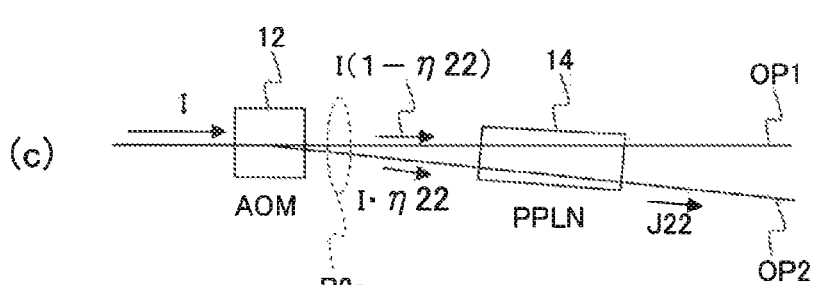

FIG. 15 shows the first power I·(1−η) and the second power I·η when the output from the wavelength changing section (PPLN) 14 is outputted through the optical path OP1. FIG. 16 shows the first power I·(1−η) and the second power I·η when the output from the wavelength changing section (PPLN) 14 is outputted through the optical path OP2.

With reference to FIG. 15, when the diffraction efficiency η=0 (see FIG. 15 (*a*)), the first power is I and the second power is 0. When the diffraction efficiency η=η11 (>0) (see FIG. 15 (*b*)), the first power is I·(1−η11) and the second power is I·η11. When the diffraction efficiency η=η21 (>η11) (see FIG. 15 (*c*)), the first power is I·(1−η21) and the second power is I·η21. Thus, as the diffraction efficiency η increases, the first power decreases.

With reference to FIG. 16, when the diffraction efficiency η=ηmax (see FIG. 16 (*a*)), the first power is I·(1−ηmax) and the second power is I·ηmax. When the diffraction efficiency η=η12 (<ηmax) (see FIG. 16 (*b*)), the first power is I·(1−η12) and the second power is I·η12. When the diffraction efficiency η=η22 (<η12) (see FIG. 16 (*c*)), the first power is I·(1−η22) and the second power is I·η22. Thus, as the diffraction efficiency η decreases, the second power decreases.

An optical attenuator not shown may be provided between the acousto-optical modulator 12 and the wavelength changing section (PPLN) 14.

The wavelength changing section (PPLN) 14 is arranged to receive light beams (i.e. second pulses P2*a*) traveling, respectively, through the two optical paths OP1, OP2 and, when the power of the traveling light beams exceeds an oscillation threshold value (to be described below), change the light beams to have their respective different wavelengths for output. The wavelength changing section 14 outputs second pulses (after wavelength conversion) P2*b*. It is noted that the wavelength changing section (PPLN) 14 is a PPLN. The wavelength changing section 14 is also an OPO (optical parametric oscillation) or an OPG (optical parametric generation).

Figure 9:
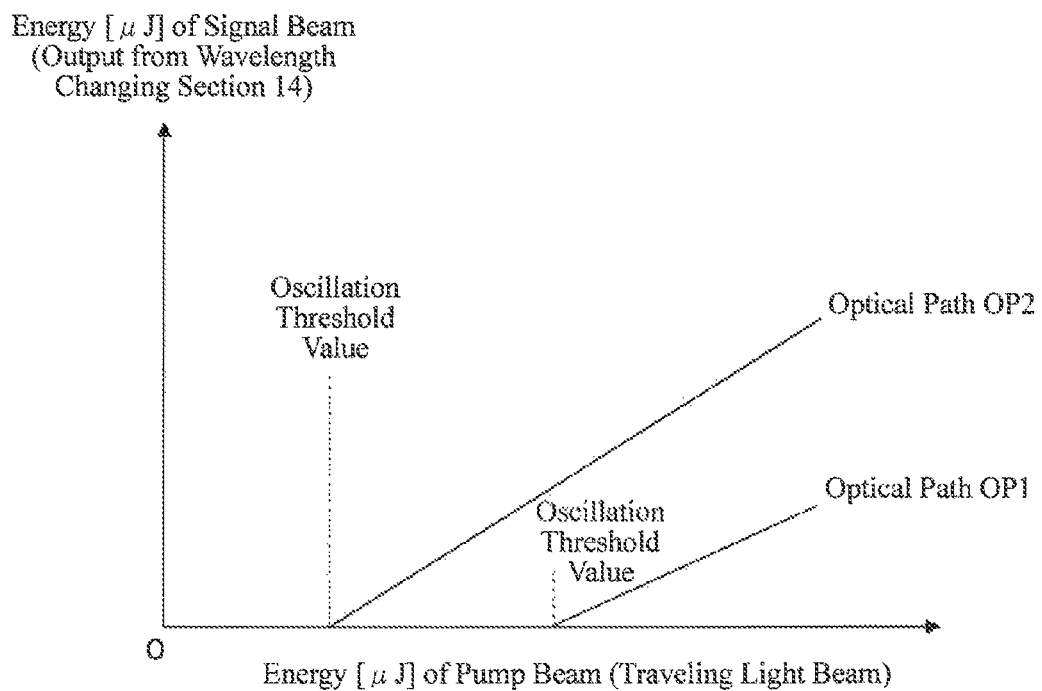
FIG. 9 shows a relationship between the pump beam energy and the signal beam energy of the wavelength changing section (PPLN) 14.

FIG. 9 shows a relationship between the pump beam energy and the signal beam energy of the wavelength changing section (PPLN) 14. Note, however, that pump beams are provided through the optical paths OP1, OP2, while signal beams are output from the optical paths OP1, OP2. Then, a pump beam (traveling light beam) provided through the optical path OP1 is 0-order light of the acousto-optical modulator 12, and a signal beam generated by the pump beam is output (from the wavelength changing section 14) through the optical path OP1. On the other hand, a pump beam (traveling light beam) provided through the optical path OP2 is 1-order light of the acousto-optical modulator 12, and a signal beam generated by the pump beam is output (from the wavelength changing section 14) through the optical path OP2.

The wavelength changing section 14 is an OPO or an OPG and thereby has an oscillation threshold value. That is, when the pump beam energy (the power of the traveling light beam) exceeds the oscillation threshold value, the signal beam is output (from the wavelength changing section 14). When the pump beam energy exceeds the oscillation threshold value, the signal beam energy increases with an increase in the pump beam energy.

It is noted that the oscillation threshold value of the pump beam (0-order light) provided through the optical path OP1 is higher than the oscillation threshold value of the pump beam (1-order light) provided through the optical path OP2. Note, however, that this is merely an example, and the oscillation threshold value of the pump beam (0-order light) may be lower than the oscillation threshold value of the pump beam (1-order light). Alternatively, the oscillation threshold value of the pump beam (0-order light) may be equal to the oscillation threshold value of the pump beam (1-order light).

It is noted that the oscillation threshold value is defined for each of the optical paths OP1, OP2, as described above.

The acousto-optical modulator 12 is arranged such that the power (first power I·(1−η) or second power I·η) of the light beam traveling through any one of the optical paths (OP1 or OP2) only exceeds the oscillation threshold value.

For example, in such a case as shown in FIG. 15, it is arranged such that the power (first power I·(1−η)) of the light beam traveling through the optical path OP1 only exceeds the oscillation threshold value.

When the diffraction efficiency η=0 (see FIG. 15 (*a*)), the first power I exceeds the oscillation threshold value and J01 is output from the wavelength changing section 14 through the optical path OP1. Since the second power 0 is lower than the oscillation threshold value, there is no output from the wavelength changing section 14 through the optical path OP2.

When the diffraction efficiency η=η11 (>0) (see FIG. 15 (*b*)), the first power is I·(1−η11) and the second power is I·η11. The first power I·(1−η11) exceeds the oscillation threshold value and J11 is output from the wavelength changing section 14 through the optical path OP1. It is noted that since the first power is lower by I·η11 than in the case where the diffraction efficiency η=0, the output J11 from the wavelength changing section 14 is also below J01. In addition, since the second power I·η11 is lower than the oscillation threshold value, there is no output from the wavelength changing section 14 through the optical path OP2.

When the diffraction efficiency 1−η21 (>η11) (see FIG. 15 (c)), the first power is I·(1−η21) and the second power is I·η21. The first power I·(1−η21) exceeds the oscillation threshold value and J21 is output from the wavelength changing section 14 through the optical path OP1. It is noted that since the first power is lower by I·(J21−η11) than in the case where the diffraction efficiency η=η11, the output J21 from the wavelength changing section 14 is also below J11. In addition, since the second power I·η21 is lower than the oscillation threshold value, there is no output from the wavelength changing section 14 through the optical path OP2.

The acousto-optical modulator 12 is thus arranged such that when the first power I·(1−η) exceeds the oscillation threshold value, the power ratio (1−η:η) is allowed to have two or more levels. For example, the power ratio may be 1:0 (see FIG. 15 (a)), 1−η11:η11 (see FIG. 15 (b)), 1−η21:η21 (see FIG. 15 (c)). This allows the output from the wavelength changing section 14 to be attenuated from J01 (see FIG. 15 (a)) to J11 (see FIG. 15 (b)) and from J11 (see FIG. 15 (b)) to J21 (see FIG. 15 (c)).

The power ratio is only required to have at least two levels and may be, for example, 1−η11:η11 (see FIG. 15 (b)) and 1·η21:η21 (see FIG. 15 (c)). This allows the output from the wavelength changing section 14 to be attenuated from J11 (see FIG. 15 (b)) to J21 (see FIG. 15 (c)).

For example, in such a case as shown in FIG. 16, it is arranged such that the power (second power I·η) of the light beam traveling through the optical path OP2 only exceeds the oscillation threshold value.

When the diffraction efficiency η=ηmax(see FIG. 16 (a)), the second power I·ηmax exceeds the oscillation threshold value and J02 is output from the wavelength changing section 14 through the optical path OP2. Since the first power I·(1−ηmax) is lower than the oscillation threshold value, there is no output from the wavelength changing section 14 through the optical path OP1.

When the diffraction efficiency η=η12 (<ηmax) (see FIG. 16 (b)), the first power is I·(1−η2) and the second power is I·η12. The second power I·η12 exceeds the oscillation threshold value and J21 is output from the wavelength changing section 14 through the optical path OP2. It is noted that since the second power is lower by I·(ηmax−η12) than in the case where the diffraction efficiency η=ηmax, the output J12 from the wavelength changing section 14 is also below J02. In addition, since the first power I·(1−η12) is lower than the oscillation threshold value, there is no output from the wavelength changing section 14 through the optical path OP1.

When the diffraction efficiency η=η22 (<η12) (see FIG. 16 (c)), the first power is I·(1−η22) and the second power is I·η22. The second power I·η22 exceeds the oscillation threshold value and J22 is output from the wavelength changing section 14 through the optical path OP2. It is noted that since the second power is lower by I·(η12−η22) than in the case where the diffraction efficiency η=η12, the output J22 from the wavelength changing section 14 is also below J12. In addition, since the first power I·(1−η22) is lower than the oscillation threshold value, there is no output from the wavelength changing section 14 through the optical path OP1.

The acousto-optical modulator 12 is thus arranged such that when the second power I·η exceeds the oscillation threshold value, the power ratio (1−η:η) is allowed to have two or more levels. For example, the power ratio may be 1−ηmax:ηmax (see FIG. 16 (a)), 1−η12:η12 (see FIG. 16 (b)), 1−η22:η22 (see FIG. 16 (c)). This allows the output from the wavelength changing section 14 to be attenuated from J02 (see FIG. 16 (a)) to J12 (see FIG. 16 (b)) and from J12 (see FIG. 16 (b)) to J22 (see FIG. 16 (c)).

The power ratio is only required to have at least two levels and may be, for example, 1−η12:η12 (see FIG. 16 (b)) and 1−η22:η22 (see FIG. 16 (c)). This allows the output from the wavelength changing section 14 to be attenuated from J12 (see FIG. 16 (b)) to J22 (see FIG. 16 (c)).

Here, with reference to FIGS. 1 and 3, at the time the acousto-optical modulator 12 receives odd-numbered (1st, 3rd . . . ) ones of the first pulses P1, it is arranged such that the power (first power I·(1−η)) of the light beam traveling through the optical path OP1 only exceeds the oscillation threshold value. The power (second power I·η) of the light beam traveling through the optical path OP2 is lower than the oscillation threshold value. For example, at the time the acousto-optical modulator 12 receives the first one of the first pulses P1, the power ratio is set to be 1−η11:η11 (see FIG. 15 (b)). At the time the acousto-optical modulator 12 receives the third one of the first pulses P1, the power ratio is set to be 1−η21:η21 (see FIG. 15 (c)).

On the other hand, at the time the acousto-optical modulator 12 receives even-numbered (2nd, 4th . . . ) ones of the first pulses P1, it is arranged such that the power (second power I·η)) of the light beam traveling through the optical path OP2 only exceeds the oscillation threshold value. The power (first power I·(1−η)) of the light beam traveling through the optical path OP1 is lower than the oscillation threshold value. For example, at the time the acousto-optical modulator 12 receives the second one of the first pulses P1, the power ratio is set to be 1−η12:η12 (see FIG. 16 (b)). At the time the acousto-optical modulator 12 receives the fourth one of the first pulses P1, the power ratio is set to be 1−η22:η22 (see FIG. 16 (c)).

This causes the acousto-optical modulator 12 to output, respectively on the multiple optical paths OP1, OP2, second pulses (before wavelength conversion) P2a having a frequency (1 kHz) obtained by dividing the predetermined frequency (e.g. 2 kHz) by the number (two) of the multiple optical paths and having their respective 180-degree different phases (where pulses with the power lower than the oscillation threshold value are ignored).

The timing control circuit (timing control section) 19 is arranged to time an output from the acousto-optical modulator (optical path determining section) 12 to an output of the first pulses P1. The result of timing has heretofore been described with reference to FIG. 3. It is noted that the timing control circuit 19 is arranged to receive a signal in synchronization with the timing of the output of the first pulses P1 from the pumping laser (pulsed laser output section) 10 and, based on this signal, control the timing of the output from the acousto-optical modulator 12.

With reference to FIG. 3, the wavelength changing section 14 is arranged to receive and convert ones (wavelength W1 [nm]) (first, third, . . . pulses with the power higher than the oscillation threshold value) of the second pulses P2a traveling through the optical path OP1 into second pulses P2b (wavelength W2 [nm]). Note, however, that even when ones (wavelength W1 [nm]) (second, fourth, . . . pulses with the power lower than the oscillation threshold value) of the second pulses P2a traveling through the optical path OP1 may be received, no second pulse P2b (wavelength W2 [nm]) is output.

On the other hand, the wavelength changing section 14 is arranged to receive and convert ones (wavelength W1 [nm]) (second, fourth, . . . pulses with the power higher than the oscillation threshold value) of the second pulses P2a traveling through the optical path OP2 into second pulses P2b (wavelength W3 [nm]). Note, however, that even when ones (wavelength W1 [nm]) (first, third, . . . pulses with the power lower than the oscillation threshold value) of the second pulses P2a traveling through the optical path OP2 may be received, no second pulse P2b (wavelength W2 [nm]) is output.

Figure 10:
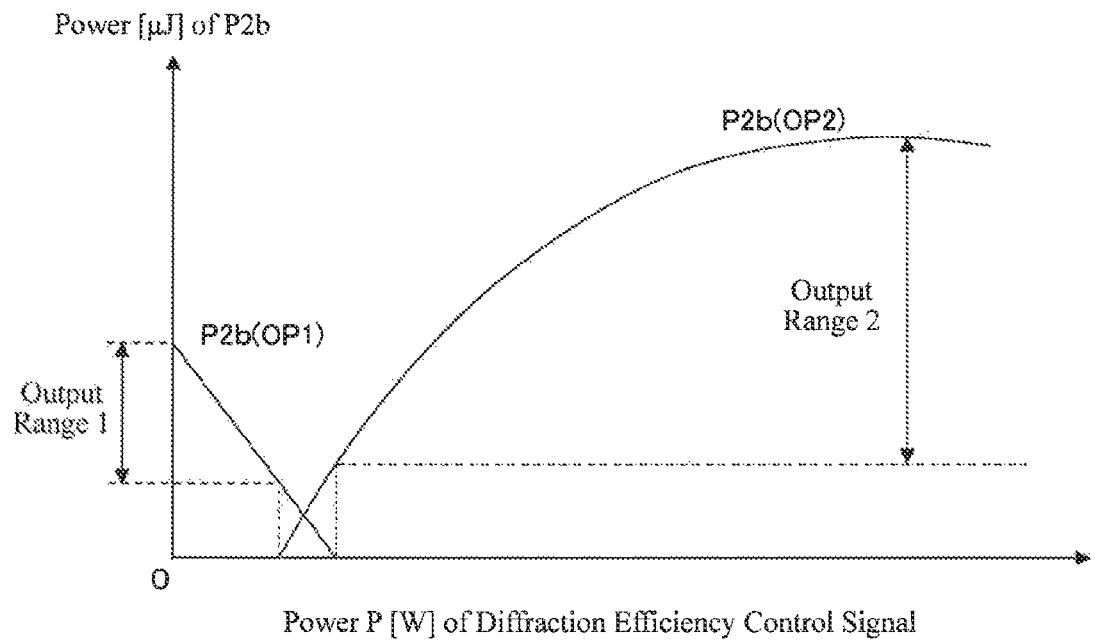
FIG. 10 shows a relationship between the power P of the diffraction efficiency control signal and the power of the second pulses P2b.

FIG. 10 shows a relationship between the power P of the diffraction efficiency control signal and the power of the second pulses P2b. When the power P of the diffraction efficiency control signal is 0, the diffraction efficiency η=0 (see FIG. 6) and the power of the second pulses P2b (traveling through the optical path OP1) is J01 (see FIG. 15 (a)). As the power P increases, the diffraction efficiency η increases (see FIG. 6), while the power of the second pulses P2b (traveling through the optical path OP1) decreases (see FIG. 15). Eventually, the second pulses P2a (traveling through the optical path OP1) have power equal to or lower than the oscillation threshold value, and no second pulse P2b (traveling through the optical path OP1) is output.

On the other hand, as the power P increases, the diffraction efficiency η increases (see FIG. 6), whereby the second pulses P2a (traveling through the optical path OP2) have power higher than the oscillation threshold value, and the second pulse P2b (traveling through the optical path OP2) are output (see FIG. 16).

The power range of the second pulses P2b when traveling only through the optical path OP1 (not traveling through the optical path OP2) is called output range 1. The power of the second pulses P2b traveling only through the optical path OP1 can be adjusted within the output range 1.

The power range of the second pulses P2b when traveling only through the optical path OP2 (not traveling through the optical path OP1) is called output range 2. The power of the second pulses P2b traveling only through the optical path OP2 can be adjusted within the output range 2.

With reference to FIG. 2, the wavelength changing section 14 has an LN crystal substrate 142 and polarization reversed sections 144. It is noted that in FIG. 2, unlike FIG. 1, the X-axis direction of the LN crystal substrate 142 is shown in parallel to the landscape orientation of the drawing sheet, for illustrative convenience.

The polarization reversed sections 144 are arranged such that traveling light beams (i.e. second pulses P2a) propagate therethrough. The polarization reversed sections 144 include ones through which the second pulses P2a traveling through the optical path OP1 propagate and the others through which the second pulses P2a traveling through the optical path OP2 propagate. It is noted that the polarization reversed sections 144 are made of PPLN (periodically polarization-reversed lithium niobate) in FIG. 2, but not limited thereto and may be made of, for example, PPLT (lithium tantalate) or PPKTP.

The polarization reversed sections 144 through which the second pulses P2a traveling through the optical path OP1 propagate are arranged at predetermined spacing D1. The polarization reversed sections 144 through which the second pulses P2a traveling through the optical path OP2 propagate are arranged at predetermined spacing D2. The predetermined spacing varies from one traveling light beam to another. That is, the predetermined spacing D1 is different from the predetermined spacing D2.

The polarization reversed sections 144 are formed in the LN crystal substrate 142. All of the polarization reversed sections 144 are formed in the single LN crystal substrate 142. It is noted that in the first embodiment, the LN crystal substrate 142 may not be an LN crystal substrate as long as being a non-linear optical crystal substrate. This applies to other embodiments, in which a non-linear optical crystal substrate can be used instead of such an LN crystal substrate.

The graphical centers 144c of the polarization reversed sections 144 through which the second pulses P2a traveling through the optical path OP1 propagate are arranged on a straight line parallel to the X axis of the LN crystal substrate 142. The graphical centers 144c of the polarization reversed sections 144 through which the second pulses P2a traveling through the optical path OP2 propagate are also arranged on a straight line parallel to the X axis of the LN crystal substrate 142. It is noted that the graphical centers 144c of the polarization reversed sections 144 correspond to the centers of gravity with the assumption that the gravity acts uniformly on each polarization reversed section 144.

The mirror 15 is arranged to receive ones of the second pulses (after wavelength conversion) P2b traveling through the optical path OP2 and reflect them toward the dichroic mirror 16.

The dichroic mirror (multiplexer) (DCM) 16 is arranged to receive, from the wavelength changing section 14, ones of the second pulses (after wavelength conversion) P2b output from the wavelength changing section 14 and traveling through the optical path OP1. The dichroic mirror 16 is further arranged to receive, from the mirror 15, ones of the second pulses (after wavelength conversion) P2b output from the wavelength changing section 14 and traveling through the optical path OP2. The dichroic mirror 16 is further arranged to multiplex ones of the second pulses (after wavelength conversion) P2b output from the wavelength changing section 14 and traveling through the optical paths OP1 and OP2 and output third pulses P3 having a predetermined frequency (2 kHz).

It is noted that a laser beam (pump beam) output from the pumping laser 10 and having a wavelength W1 [nm] and an infrared idler beam originating from the wavelength changing section 14 are also mixed into the output from the wavelength changing section 14. It is noted that the wavelength changing section 14, when applied with a laser beam (pump beam), generates a signal beam and such an idler beam as described above due to optical parametric oscillation. The signal beam is thus output from the wavelength changing section 14 (as second pulses (after wavelength conversion) P2b) (the same applies to wavelength changing sections according to other embodiments).

The filters (F) 172, 174 are arranged to remove pump beams and idler beams from the second pulses (after wavelength conversion) P2b output from the wavelength changing section 14 traveling through the respective optical paths OP1, OP2 for output to the dichroic mirror 16 and the mirror 15. It is noted that the filters 172, 174 are arranged between the respective half mirrors 130a, 130b and the wavelength changing section 14 so that neither pump beam nor idler beam enters the photodiodes 132a, 132b.

The optical fiber (MMF) 18 is arranged to receive, at one end thereof, the third pulses P3 output from the dichroic mirror 16 for output at the other end thereof.

The half mirrors 130a, 130b are arranged to partially reflect the second pulses (after wavelength conversion) P2b output from the wavelength changing section 14 traveling through the respective optical paths OP1, OP2 for output to the photodiodes (output measuring sections) (PD) 132a, 132b.

The photodiodes (output measuring sections) (PD) 132a, 132b are arranged to measure the output from the wavelength changing section 14 received via the respective half mirrors 130a, 130b.

The diffraction efficiency control section (power ratio change signal providing section) 120 is arranged to provide a diffraction efficiency control signal (power ratio change signal) to the acousto-optical modulator (optical path determining section) (AOM) 12. The diffraction efficiency control signal causes change in the diffraction efficiency $\eta$ and therefore the power ratio $(1-\eta:\eta)$.

Figure 7:
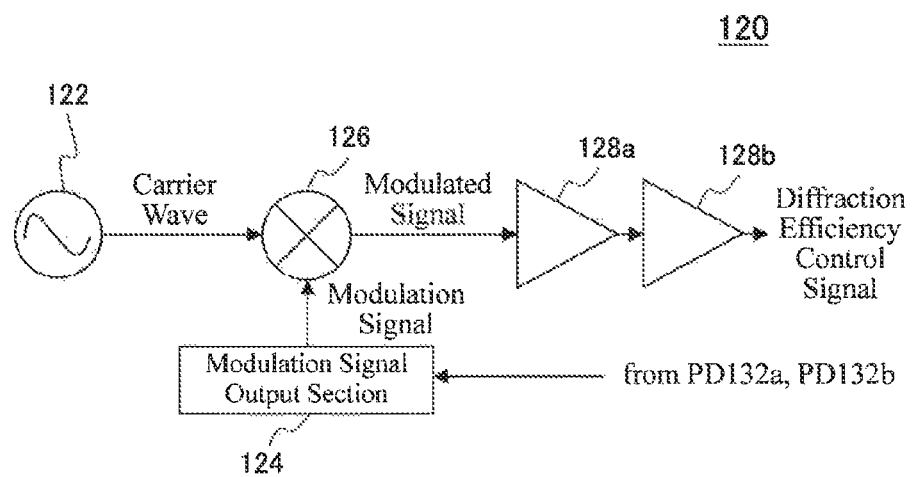
FIG. 7 is a functional block diagram showing a configuration of the diffraction efficiency control section 120.

FIG. 7 is a functional block diagram showing a configuration of the diffraction efficiency control section 120. The diffraction efficiency control section 120 has a carrier wave source 122, a modulation signal output section 124, a mixer 126, and amplifiers (amplitude changers) 128a, 128b.

The carrier wave source 122 is arranged to output a carrier wave. The modulation signal output section 124 is arranged to output a voltage-variable modulation signal. The mixer 126 is arranged to mix the carrier wave and the modulation signal to output a modulated signal. The mixer 126 has an LO port, an IF port, and an RF port. For example, the carrier wave may be provided to the LO port, the modulation signal may be provided to the IF port, and the modulated signal may be output through the RF port. The amplifiers (amplitude changers) 128a, 128b are arranged to change the amplitude of the modulated signal to output a diffraction efficiency control signal (power ratio change signal).

Figure 8:
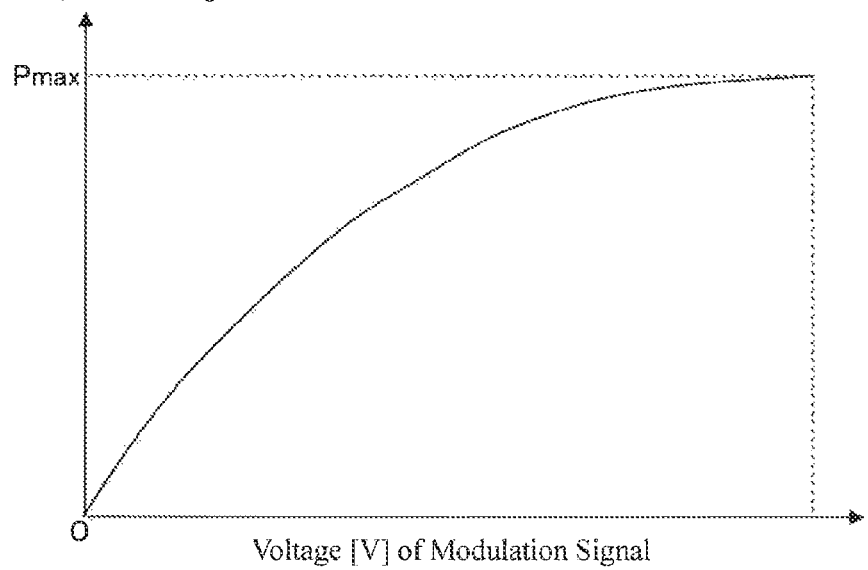
FIG. 8 shows a relationship between the voltage of the modulation signal and the power P of the diffraction efficiency control signal.

FIG. 8 shows a relationship between the voltage of the modulation signal and the power P of the diffraction efficiency control signal. As the voltage of the modulation signal increases from 0, the power P of the diffraction efficiency control signal also increases from 0 to Pmax.

Thus changing the voltage of the modulation signal allows for change in the power P of the diffraction efficiency control signal (magnitude of the power ratio change signal). For example, the modulation signal output section 124 of the diffraction efficiency control section (power ratio change signal providing section) 120 is arranged to change the power P of the diffraction efficiency control signal (magnitude of the power ratio change signal) based on a result of measurement by the photodiodes (output measuring sections) (PD) 132a, 132b.

Next will be described an operation according to the first embodiment.

The pumping laser 10 first outputs a laser beam having a predetermined wavelength W1 [nm] as first pulses P1 having a predetermined frequency (e.g. 2 kHz) (see FIG. 3). The first pulses P1 are provided to the acousto-optical modulator 12. The timing control circuit 19 controls the timing of the output from the acousto-optical modulator 12 (see FIG. 3).

On the other hand, the diffraction efficiency control section 120 provides a diffraction efficiency control signal to the acousto-optical modulator 12 to adjust the diffraction efficiency $\eta$ (see FIG. 6).

At the time the acousto-optical modulator 12 receives odd-numbered (1st, 3rd . . . ) ones of the first pulses P1, it is arranged such that the power (first power $I\cdot(1-\eta)$) of the light beam traveling through the optical path OP1 only exceeds the oscillation threshold value. This causes light beams traveling through the optical path OP1 to be second pulses (before wavelength conversion) P2a having a frequency (1 kHz) obtained by dividing the predetermined frequency (e.g. 2 kHz) by the number (two) of the multiple optical paths (where pulses with the power lower than the oscillation threshold value are ignored).

At the time the acousto-optical modulator 12 receives even-numbered (2nd, 4th . . . ) ones of the first pulses P1, it is arranged such that the power (second power $I\cdot\eta$) of the light beam traveling through the optical path OP2 only exceeds the oscillation threshold value. This causes light beams traveling through the optical path OP2 to be second pulses (before wavelength conversion) P2a having a frequency (1 kHz) obtained by dividing the predetermined frequency (e.g. 2 kHz) by the number (two) of the multiple optical paths (where pulses with the power lower than the oscillation threshold value are ignored).

In addition, the phase of the light beams traveling through the optical path OP1 (second pulses (before wavelength conversion) P2a) is 180-degree different from the phase of the light beams traveling through the optical path OP2 (second pulses (before wavelength conversion) P2a) (where pulses with the power lower than the oscillation threshold value are ignored).

The light beams traveling through the optical path OP1 (second pulses (before wavelength conversion) P2a, with a wavelength W1 [nm]) (where pulses with the power lower than the oscillation threshold value are ignored) propagate through the polarization reserved sections 144, which are arranged at the predetermined spacing D1 in the wavelength changing section 14, to undergo wavelength conversion into W2 [nm] and provided to the dichroic mirror 16 as second pulses (after wavelength conversion) P2b.

The light beams traveling through the optical path OP2 (second pulses (before wavelength conversion) P2a, with a wavelength W1 [nm]) (where pulses with the power lower than the oscillation threshold value are ignored) propagate through the polarization reserved sections 144, which are arranged at the predetermined spacing D2 in the wavelength changing section 14, to undergo wavelength conversion into W3 [nm], and reflected by the mirror 15 and provided to the dichroic mirror 16 as second pulses (after wavelength conversion) P2b.

Ones of the second pulses (after wavelength conversion) P2b output from the wavelength changing section 14 and having the wavelength W2 [nm] and the wavelength W3 [nm] are multiplexed through the dichroic mirror 16 to be third pulses P3 having a predetermined frequency (2 kHz).

The third pulses P3 are provided at one end and output through the other end of the optical fiber 18.

It is noted that the second pulses (after wavelength conversion) P2b output from the wavelength changing section 14 are provided via the half mirrors 130a, 130b to the photodiodes (output measuring sections) (PD) 132a, 132b. The diffraction efficiency control section 120 determines the magnitude of the diffraction efficiency control signal to be provided to the acousto-optical modulator 12 based on a result of measurement by the photodiodes 132a, 132b.

In accordance with the first embodiment, the third pulses P3 can be output from the optical fiber 18. The third pulses P3 provides for irradiation with pulsed light of the wavelength W2 [nm] and immediately thereafter (e.g. after 500 microseconds) pulsed light of the different wavelength W3 [nm]. That is, the first embodiment allows for irradiation with pulsed light of one wavelength and immediately thereafter pulsed light of another wavelength.

Also, in accordance with the first embodiment, with reference to FIG. 15, increasing the power (second power $I\cdot\eta$) of the light beam traveling through the optical path OP2 (not to exceed the oscillation threshold value so that nothing is output from the wavelength changing section 14 through the optical path OP2) allows the power (first power $I\cdot(1-\eta)$) of the light beam traveling through the optical path OP1 to decrease and thereby the output from the wavelength changing section 14 (through the optical path OP1) to attenuate for adjustment of the output (third pulses P3) from the laser beam output apparatus 1.

Further, in accordance with the first embodiment, with reference to FIG. 16, increasing the power (first power I·(1−η)) of the light beam traveling through the optical path OP1 (not to exceed the oscillation threshold value so that nothing is output from the wavelength changing section 14 through the optical path OP1) allows the power (second power I·η) of the light beam traveling through the optical path OP2 to decrease and thereby the output from the wavelength changing section 14 (through the optical path OP2) to attenuate for adjustment of the output (third pulses P3) from the laser beam output apparatus 1.

The output from the wavelength changing section 14 can thus be attenuated at higher speed and with smaller installation than in the case where a variable optical attenuator has a half-wavelength plate and a polarizer and the half-wavelength plate is rotated with a motor (see Japanese Patent Application Publication No. 2010-256784).

First Variation

It is noted that the graphical centers 144c of the polarization reversed sections 144 are arranged on a straight line parallel to the X axis of the LN crystal substrate 142 in the first embodiment (see FIG. 2), but may be arranged as in the following variation.

Figure 4:
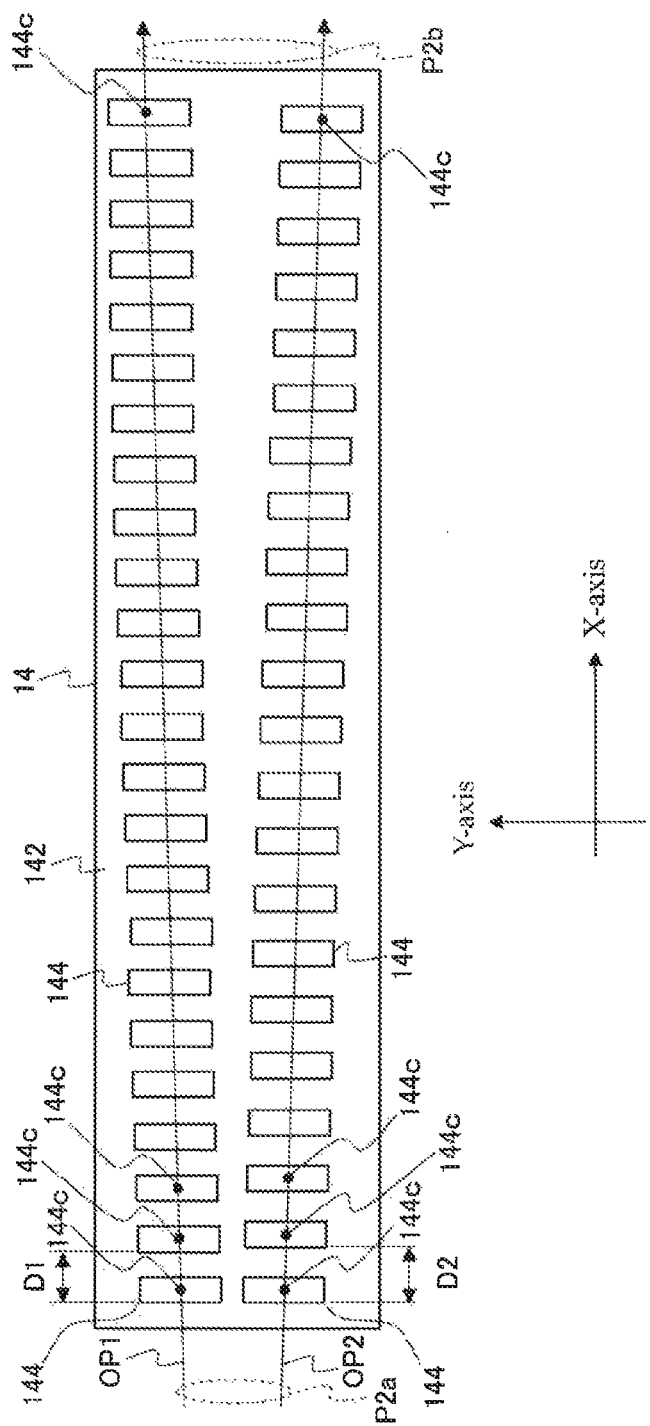
FIG. 4 is a plan view of a wavelength changing section 14 according to a first variation of the first embodiment.

FIG. 4 is a plan view of a wavelength changing section 14 according to a first variation of the first embodiment. It is noted that in FIG. 4, unlike FIG. 1 but like FIG. 2, the X-axis direction of the LN crystal substrate 142 is shown in parallel to the landscape orientation of the drawing sheet, for illustrative convenience.

With reference to FIG. 4, in the wavelength changing section 14 according to the first variation of the first embodiment, the polarization reversed sections 144 through which the traveling light beams (second pulses P2a traveling through the optical path OP1) propagate are arranged at the predetermined spacing D1 and the graphical centers 144c thereof are arranged on a straight line parallel to the traveling direction (e.g. on the traveling direction) of the traveling light beams (second pulses P2a traveling through the optical path OP1). The polarization reversed sections 144 through which the traveling light beams (second pulses P2a traveling through the optical path OP2) propagate are also arranged at the predetermined spacing D2 and the graphical centers 144c thereof are arranged on a straight line parallel to the traveling direction (e.g. on the traveling direction) of the traveling light beams (second pulses P2a traveling through the optical path OP2).

In accordance with the first variation of the first embodiment as described above, the longitudinal length of each polarization reversed section 144 (in the Y-axis direction) can be reduced relative to the case in the first embodiment.

Further, while the polarization reversed sections 144 are provided in the wavelength changing section 14 in the first embodiment (see FIGS. 2 and 4), another variation may have a non-linear optical crystal through which traveling light beams propagate without such polarization reversed sections 144. For example, the wavelength changing section 14 may undergo BPM (birefringent phase matching)-based OPO (optical parametric oscillation), SHG (second harmonic generation), THG (third harmonic generation), or the like.

Second Variation

It is noted that while only one LN crystal substrate 142 is provided in the first embodiment, LN crystal substrates may be provided for each traveling light beam propagating therethrough in a variation.

Figure 5:
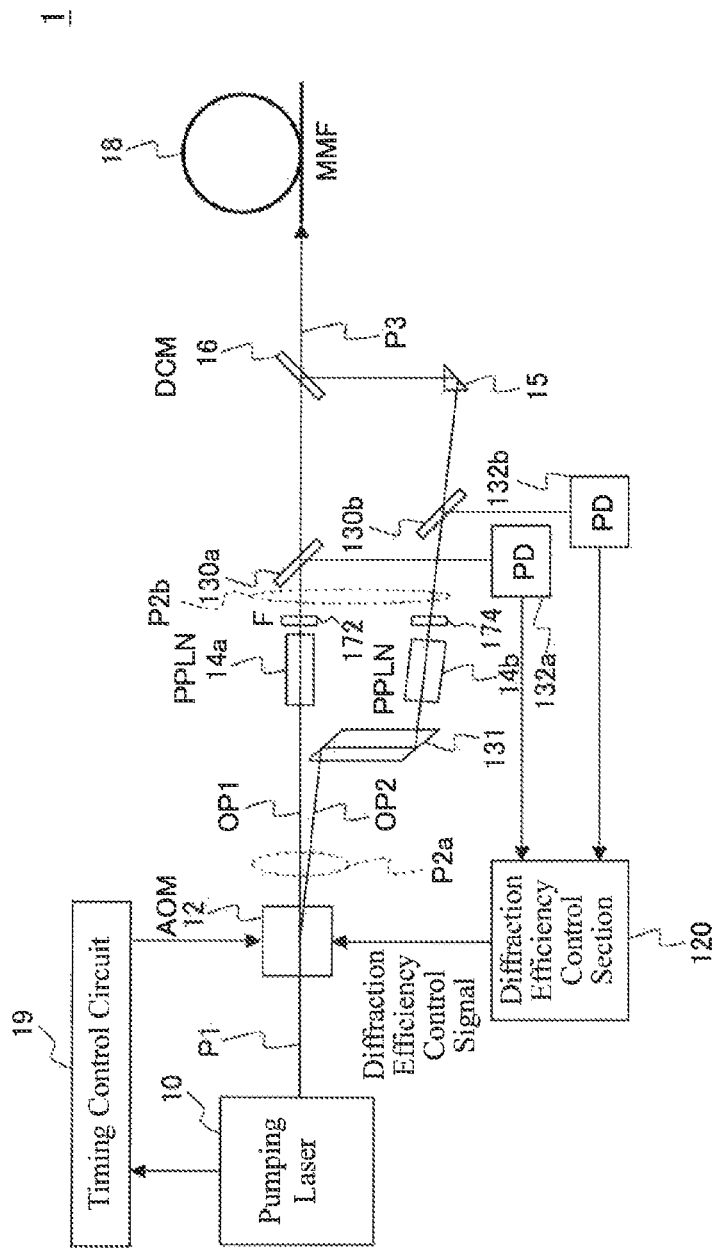
FIG. 5 shows a configuration of a laser beam output apparatus 1 according to a second variation of the first embodiment.

FIG. 5 shows a configuration of a laser beam output apparatus 1 according to a second variation of the first embodiment. Differences from the first embodiment are a rhomboid prism 131 and wavelength changing sections (PPLN) 14a, 14b. The rest is identical to those in the first embodiment, and the description thereof will be omitted.

The rhomboid prism 131 is arranged to receive ones of the second pulses (before wavelength conversion) P2a traveling through the optical path OP2 and change the optical path in parallel away from the optical path OP1.

The wavelength changing section (PPLN) 14a is arranged to receive from the acousto-optical modulator 12 ones (wavelength W1 [nm]) of the second pulses P2a traveling through the optical path OP1 and only convert ones exceeding the oscillation threshold value into second pulses P2b (wavelength W2 [nm]). The arrangement of the wavelength changing section 14a corresponds to the polarization reversed sections 144 arranged at the predetermined spacing D1 and the LN crystal substrate 142 in which the polarization reversed sections 144 are formed as shown in FIG. 2 or 4.

The wavelength changing section (PPLN) 14b is arranged to receive from the rhomboid prism 131 ones (wavelength W1 [nm]) of the second pulses P2a traveling through the optical path OP2 and only convert ones exceeding the oscillation threshold value into second pulses P2b (wavelength W3 [nm]). The arrangement of the wavelength changing section 14b corresponds to the polarization reversed sections 144 arranged at the predetermined spacing D2 and the LN crystal substrate 142 in which the polarization reversed sections 144 are formed as shown in FIG. 2 or 4.

It is noted that the LN crystal substrate that the wavelength changing section 14a has is not identical to the LN crystal substrate that the wavelength changing section 14b has. That is, the LN crystal substrate that the wavelength changing section 14a has and the LN crystal substrate that the wavelength changing section 14b has are provided, respectively, for the light beams (traveling through the optical path OP1 and the optical path OP2) that propagate therethrough.

In accordance with the second variation of the first embodiment, the LN crystal substrates are provided, respectively, for the light beams (traveling through the optical path OP1 and the optical path OP2) that propagate therethrough, whereby conditions of manufacture for the polarization reversed sections 144 can be set according to the predetermined spacing D1, D2, which makes it easy to manufacture the wavelength changing sections 14a, 14b.

Third Variation

Figure 11:
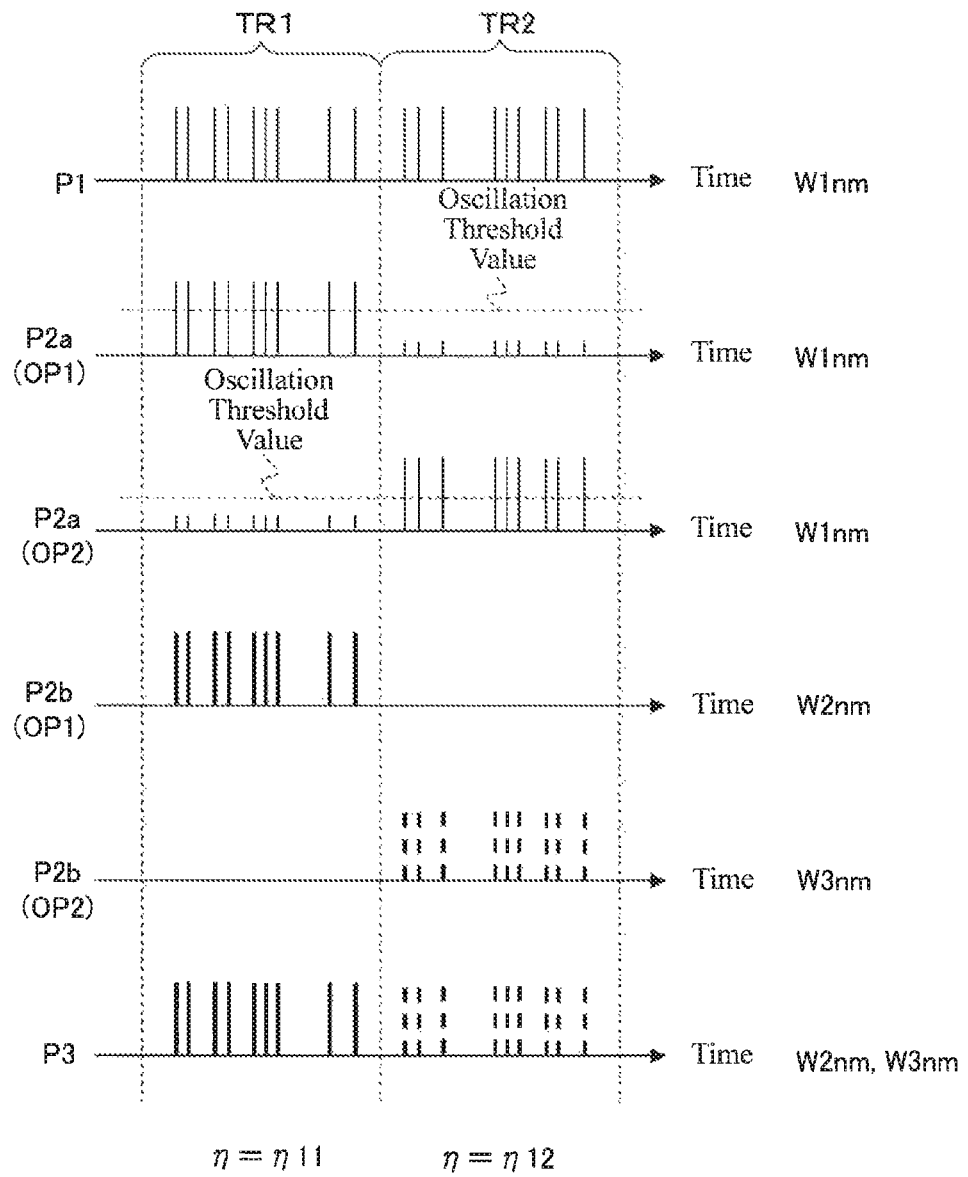
FIG. 11 shows timing charts of first pulses P1, second pulses (before wavelength conversion) P2a, second pulses (after wavelength conversion) P2b, and third pulses P3 according to the third variation of the first embodiment.

It is noted that while in the first embodiment, irradiation is provided with "one" pulse of light of one wavelength W2 [nm] and immediately thereafter "one" pulse of light of another wavelength W3 [nm] (see P3 in FIG. 3), there may be a variation in which irradiation is provided with "multiple" pulses of light of one wavelength W2 [nm] (within a predetermined temporal range TR1) and immediately thereafter "multiple" pulses of light of another wavelength W3 [nm] (within a predetermined temporal range TR2) (see P3 in FIG. 11).

The laser beam output apparatus 1 according to this variation is also arranged such that the first pulses P1 have a non-constant frequency, which differs from the first embodiment in which the first pulses P1 have a constant frequency (e.g. 2 kHz).

FIG. 11 shows timing charts of first pulses P1, second pulses (before wavelength conversion) P2a, second pulses (after wavelength conversion) P2b, and third pulses P3 according to the third variation of the first embodiment. It is noted that in FIG. 11, the thickness and type (solid or broken) of lines indicating the pulses vary depending on the wavelength. FIG. 11 also shows the case where the diffraction efficiency η=η11, η12.

The pumping laser (pulsed laser output section) 10 is arranged to output a laser beam having a predetermined wavelength W1 [nm] as first pulses P1 (see FIG. 11). The pumping laser 10 is, for example, a Yb:YAG laser. With reference to FIG. 11, the first pulses P1 are from a pseudo-random signal (e.g. M-sequence signal) output for each of the predetermined temporal ranges TR1, TR2. It is noted that the length of the predetermined temporal ranges TR1, TR2 corresponds to one cycle of the M-sequence signal. It is further noted that unlike the first embodiment, the first pulses P1 are from a pseudo-random signal and thereby have a non-constant frequency.

The acousto-optical modulator (optical path determining section) (AOM) 12 is arranged to receive the first pulses P1 and determine one or more among the two optical paths OP1, OP2 for each of the first pulses P1 for output.

For example, with reference to FIG. 11, at the time the acousto-optical modulator 12 receives multiple ones within a predetermined temporal range TR1 of the first pulses P1, it is arranged such that the power (first power I·(1−η)) of the light beam traveling through the optical path OP1 only exceeds the oscillation threshold value. The power (second power I·η) of the light beam traveling through the optical path OP2 is lower than the oscillation threshold value. At the time the acousto-optical modulator 12 receives multiple ones within a predetermined temporal range TR1 of the first pulses P1, the power ratio is set to be 1−η11:η11 (see FIG. 15 (b)).

On the other hand, at the time the acousto-optical modulator 12 receives multiple ones within a predetermined temporal range TR2 of the first pulses P1, it is arranged such that the power (second power I·η)) of the light beam traveling through the optical path OP2 only exceeds the oscillation threshold value. The power (first power I·(1−η)) of the light beam traveling through the optical path OP1 is lower than the oscillation threshold value. At the time the acousto-optical modulator 12 receives multiple ones within a predetermined temporal range TR2 of the first pulses P1, the power ratio is set to be 1−η12:η12 (see FIG. 16 (b)).

This causes the acousto-optical modulator 12 to output, respectively on the multiple optical paths OP1, OP2, second pulses (before wavelength conversion) P2a (exceeding the oscillation threshold value only) which are multiple pulses among the first pulses P1 within the predetermined temporal ranges TR1, TR2, the predetermined temporal ranges differing from (not overlapping) each other.

That is, the acousto-optical modulator 12 outputs, on the optical path OP1, multiple ones of the first pulses P1 within the predetermined temporal range TR1 (see P2a (OP1) in FIG. 9). The acousto-optical modulator 12 further outputs, on the optical path OP2, multiple ones of the first pulses P1 within the predetermined temporal range TR2 (see P2a (OP2) in FIG. 9). The second pulses P2a traveling through the optical path OP1 (P2a (OP1)) (exceeding the oscillation threshold value only) and the second pulses P2a traveling through the optical path OP2 (P2a (OP2)) (exceeding the oscillation threshold value only) have their respective different predetermined temporal ranges (not overlapping each other).

The wavelength changing section (PPLN) 14 is arranged to receive light beams (i.e. second pulses P2a) traveling, respectively, through the multiple optical paths OP1, OP2 and changes the light beams to have their respective different wavelengths for output. The wavelength changing section 14 outputs second pulses (after wavelength conversion) P2b.

With reference to FIG. 11, the wavelength changing section 14 is arranged to receive and convert ones (wavelength W1 [nm]) (exceeding the oscillation threshold value only) of the second pulses P2a traveling through the optical path OP1 into second pulses P2b (wavelength W2 [nm]). The wavelength changing section 14 is also arranged to receive and convert ones (wavelength W1 [nm]) (exceeding the oscillation threshold value only) of the second pulses P2a traveling through the optical path OP2 into second pulses P2b (wavelength W3 [nm]).

In accordance with the third variation of the first embodiment, the third pulses P3 can be output from the optical fiber 18. The third pulses P3 provides for irradiation with multiple pulses of light of the wavelength W2 [nm] and immediately thereafter multiple pulses of light of the different wavelength W3 [nm]. That is, the third variation of the first embodiment allows for irradiation with pulsed light of one wavelength and immediately thereafter pulsed light of another wavelength.

Second Embodiment

The laser beam output apparatus 1 according to a second embodiment includes, in lieu of the dichroic mirror (multiplexer) (DCM) 16 according to the first embodiment, a convex lens (parallelizing section) (L1) 13 and an achromatic lens (focusing section) (L2) 160.

Figure 12:
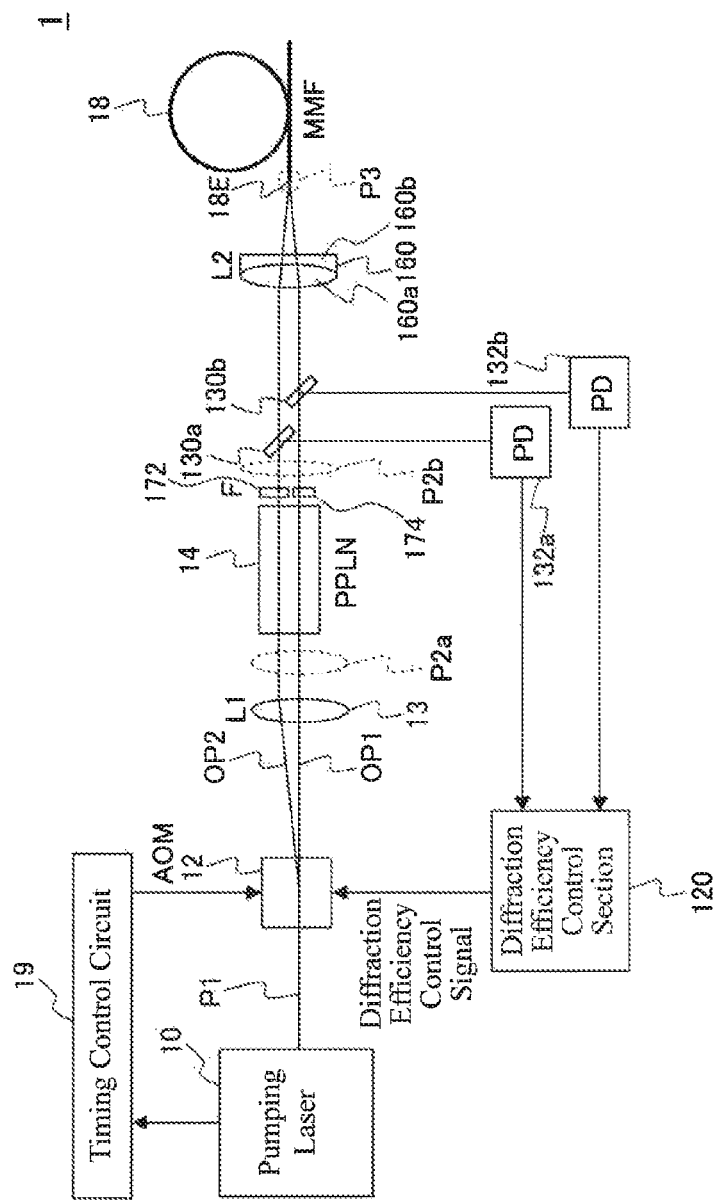
FIG. 12 shows a configuration of the laser beam output apparatus 1 according to the second embodiment.
Figure 13:
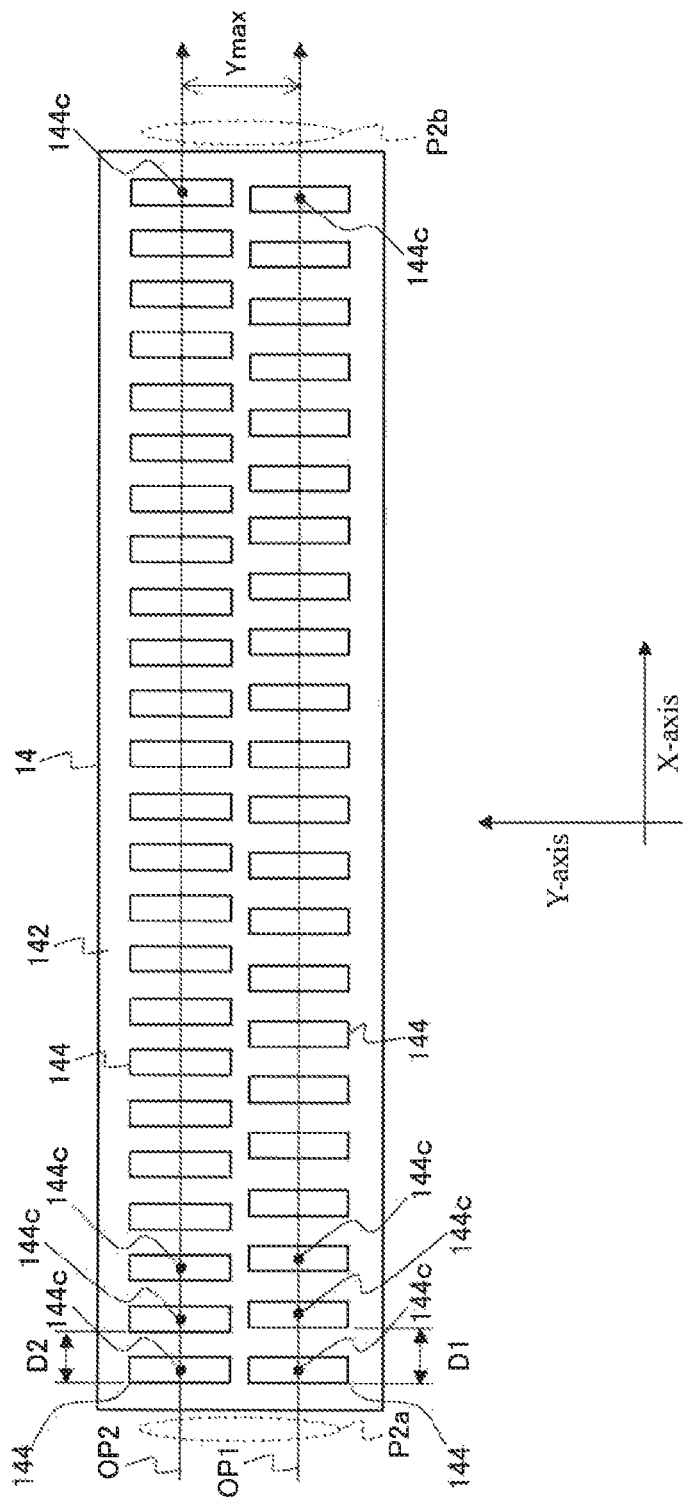
FIG. 13 is a plan view of a wavelength changing section 14 according to the second embodiment.

FIG. 12 shows a configuration of the laser beam output apparatus 1 according to the second embodiment. FIG. 13 is a plan view of a wavelength changing section 14 according to the second embodiment.

The laser beam output apparatus 1 according to the second embodiment includes a pumping laser (pulsed laser output section) 10, an acousto-optical modulator (optical path determining section) (AOM) 12, a convex lens (parallelizing section) (L1) 13, a wavelength changing section (PPLN) 14, an achromatic lens (focusing section) (L2) 160, filters (F) 172, 174, an optical fiber (MMF) 18, a timing control circuit (timing control section) 19, a diffraction efficiency control section (power ratio change signal providing section) 120, half mirrors 130a, 130b, and photodiodes (output measuring sections) (PD) 132a, 132b. Components identical to those in the first embodiment will hereinafter be designated by the same reference signs to omit the description thereof.

The pumping laser (pulsed laser output section) 10, the acousto-optical modulator (optical path determining section) (AOM) 12, the filters (F) 172, 174, the timing control circuit (timing control section) 19, the diffraction efficiency control section (power ratio change signal providing section) 120, the half mirrors 130a, 130b, and the photodiodes (output measuring sections) (PD) 132a, 132b are identical to those in the first embodiment, and the description thereof will be omitted.

The convex lens (parallelizing section) (L1) 13 is arranged to parallelize the traveling direction of light beams traveling, respectively, through the two optical paths OP1, OP2. It is noted that the parallelizing section may employ a prism instead of the convex lens 13.

It is noted that Ymax defining the maximum distance between outputs from the convex lens (parallelizing section) 13 represents the distance between the optical paths OP1 and OP2 extending from the convex lens 13 to the achromatic lens 160 (see FIG. 13).

Like that in the first embodiment, the wavelength changing section (PPLN) 14 is arranged to receive outputs from the convex lens (parallelizing section) 13, that is, light beams (i.e. second pulses P2a) traveling, respectively, through the two optical paths OP1, OP2 and then going through the convex lens 13 and, when the power of the output from the convex lens (parallelizing section) 13 exceeds the oscillation threshold value, to change the light beams to have their respective different wavelengths for output. The wavelength changing section 14 outputs second pulses (after wavelength conversion) P2b.

It is noted that one of the outputs from the acousto-optical modulator 12 (e.g. one traveling through the optical path OP1) may pass through the optical axis of the convex lens 13. In this case, the convex lens 13 is arranged not to change the traveling direction of light beams traveling through the optical path OP1, but to change the traveling direction of light beams traveling through the optical path OP2 to be in parallel to the optical path OP1.

With reference to FIG. 3, the wavelength changing section 14 is arranged to receive and convert ones (wavelength W1 [nm]) of the second pulses P2a traveling through the optical path OP1 into second pulses P2b (wavelength W2 [nm]) (excessing the oscillation threshold value only). The wavelength changing section 14 is arranged to receive and convert ones (wavelength W1 [nm]) of the second pulses P2a traveling through the optical path OP2 into second pulses P2b (wavelength W3 [nm]) (excessing the oscillation threshold value only). It is noted that the oscillation threshold value of the wavelength changing section 14 is identical to that of the first embodiment, and the description thereof will be omitted (see FIG. 9).

With reference to FIG. 13, the wavelength changing section 14 has an LN crystal substrate 142 and polarization reversed sections 144. It is noted that in FIG. 2, like FIG. 1, the X-axis direction of the LN crystal substrate 142 is shown in parallel to the landscape orientation of the drawing sheet.

The polarization reversed sections 144 are arranged such that outputs from the convex lens 13 (i.e. second pulses P2a) propagate therethrough. The polarization reversed sections 144 include ones through which the second pulses P2a traveling through the optical path OP1 propagate and the others through which the second pulses P2a traveling through the optical path OP2 propagate. It is noted that the polarization reversed sections 144 are made of PPLN (periodically polarization-reversed lithium niobate) in FIG. 13, but not limited thereto and may be made of, for example, PPLT (lithium tantalate) or PPKTP.

The polarization reversed sections 144 through which the second pulses P2a traveling through the optical path OP1 propagate are arranged at predetermined spacing D1. The polarization reversed sections 144 through which the second pulses P2a traveling through the optical path OP2 propagate are arranged at predetermined spacing D2. The predetermined spacing varies depending on the outputs from the convex lens 13. That is, the predetermined spacing D1 is different from the predetermined spacing D2.

The polarization reversed sections 144 are formed in the LN crystal substrate 142. All of the polarization reversed sections 144 are formed in the single LN crystal substrate 142. It is noted that in the second embodiment, the LN crystal substrate 142 may not be an LN crystal substrate as long as being a non-linear optical crystal substrate. This applies to other embodiments, in which a non-linear optical crystal substrate can be used instead of such an LN crystal substrate.

The graphical centers 144c of the polarization reversed sections 144 through which the second pulses P2a traveling through the optical path OP1 propagate are arranged on a straight line parallel to the X axis of the LN crystal substrate 142. The graphical centers 144c of the polarization reversed sections 144 through which the second pulses P2a traveling through the optical path OP2 propagate are also arranged on a straight line parallel to the X axis of the LN crystal substrate 142. It is noted that the graphical centers 144c of the polarization reversed sections 144 correspond to the centers of gravity with the assumption that the gravity acts uniformly on each polarization reversed section 144.

It is noted that in addition to the second pulses P2b, a laser beam (pump beam) output from the pumping laser 10 and having a wavelength W1 [nm] and an infrared idler beam originating from the wavelength changing section 14 are also mixed into the output from the wavelength changing section 14. It is noted that the wavelength changing section 14, when applied with a laser beam (pump beam), generates a signal beam and such an idler beam as described above due to optical parametric oscillation. The signal beam is thus output from the wavelength changing section 14 (as second pulses (after wavelength conversion) P2b) (the same applies to wavelength changing sections according to other embodiments).

The achromatic lens (focusing section) (L2) 160 is arranged to receive and focus outputs from the wavelength changing section 14. The achromatic lens 160 has a convex lens 160a and a concave lens 160b. The convex lens 160a is arranged at a position closer to the pumping laser 10 than the concave lens 160b. The convex surface of the convex lens 160a is in contact with the concave surface of the concave lens 160b.

The achromatic lens 160 is used to reduce the difference in the focal length (chromatic aberration) due to the difference in the wavelength between the second pulses P2b (wavelength W2 [nm]) (traveling through the optical path OP1) and the second pulses P2b (wavelength W3 [nm]) (traveling through the optical path OP2).

It is noted that when the difference between the wavelength W2 [nm] and the wavelength W3 [nm] is small, the focusing section may employ a single convex lens 160a instead of the achromatic lens 160.

The optical fiber (MMF) 18 has the core, and the core has the end face 18E. The optical fiber 18 is arranged to receive outputs from the achromatic lens 160 at the end face 18E of the core. The achromatic lens 160 is arranged to focus the outputs from the wavelength changing section 14 on the end face 18E of the core.

In order to focus the outputs from the wavelength changing section 14 on the end face 18E of the core, it is preferred that NA>Ymax/(2f), where f represents the focal length of the achromatic lens 160 and NA represents the numerical aperture of the optical fiber 18.

The optical fiber (MMF) 18 is arranged to cause the outputs from the wavelength changing section 14 focused on the end face 18E of the core to be output through the other end (third pulses P3) (see FIG. 3).

Next will be described an operation according to the second embodiment.

Operations of the pumping laser 10, the acousto-optical modulator 12, and the timing control circuit 19 are identical to those in the first embodiment, and the description thereof will be omitted.

Light beams traveling through the optical path OP1 go straight through the convex lens 13 in its optical axis direction to be second pulses (before wavelength conversion) P2a (see FIG. 3) having a frequency (1 kHz) obtained by dividing the predetermined frequency (e.g. 2 kHz) by the number (two) of the multiple optical paths (where pulses with the power lower than the oscillation threshold value are ignored).

Light beams traveling through the optical path OP2 go through the convex lens 13 while traveling into parallel to the optical path OP1 to be second pulses (before wavelength conversion) P2a (see FIG. 3) having a frequency (1 kHz) obtained by dividing the predetermined frequency (e.g. 2 kHz) by the number (two) of the multiple optical paths (where pulses with the power lower than the oscillation threshold value are ignored).

In addition, the phase of the light beams traveling through the optical path OP1 and going through the convex lens 13 (second pulses (before wavelength conversion) P2a) is 180-degree different from the phase of the light beams traveling through the optical path OP2 and going through the convex lens 13 (second pulses (before wavelength conversion) P2a) (where pulses with the power lower than the oscillation threshold value are ignored).

The light beams traveling through the optical path OP1 and going through the convex lens 13 (second pulses (before wavelength conversion) P2a, with a wavelength W1 [nm]) (where pulses with the power lower than the oscillation threshold value are ignored) propagate through the polarization reserved sections 144, which are arranged at the predetermined spacing D1 in the wavelength changing section 14, to undergo wavelength conversion into W2 [nm], and travel through the filter 172 for removal of the pump beam and the idler beam and then provided to the achromatic lens 160 as second pulses (after wavelength conversion) P2b (see FIG. 3).

The light beams traveling through the optical path OP2 and going through the convex lens 13 (second pulses (before wavelength conversion) P2a, with a wavelength W1 [nm]) (where pulses with the power lower than the oscillation threshold value are ignored) propagate through the polarization reserved sections 144, which are arranged at the predetermined spacing D2 in the wavelength changing section 14, to undergo wavelength conversion into W3 [nm], and travel through the filter 174 for removal of the pump beam and the idler beam and then provided to the achromatic lens 160 as second pulses (after wavelength conversion) P2b (see FIG. 3).

Ones of the second pulses (after wavelength conversion) P2b output from the wavelength changing section 14 and having the wavelength W2 [nm] and the wavelength W3 [nm] are focused through the achromatic lens 160 onto the end face 18E of the core of the optical fiber 18 to be third pulses P3 having a predetermined frequency (2 kHz) (having the same waveform as P3 in FIG. 3).

The third pulses P3 are output through the other end of the optical fiber 18.

Operations of the half mirrors 130a, 130b, the photodiodes (output measuring sections) (PD) 132a, 132b, and the diffraction efficiency control section 120 are identical to those in the first embodiment, and the description thereof will be omitted.

The second embodiment exhibits the same advantageous effects as the first embodiment.

In addition, in accordance with the second embodiment, no multiplexer (e.g. dichroic mirror) is required to multiplex ones of the second pulses (after wavelength conversion) P2b output from the wavelength changing section 14 and having the wavelength W2 [nm] and the wavelength W3 [nm]. While it is difficult, with a dichroic mirror, to adjust the optical axis and accommodate the change in the wavelength W2 [nm] and the wavelength W3 [nm] of the second pulses (after wavelength conversion) P2b, such an effort can be reduced if no dichroic mirror is required.

It is noted that in the second embodiment, like the third variation of the first embodiment (see FIG. 11), irradiation may be provided with "multiple" pulses of light of one wavelength W2 [nm] (within a predetermined temporal range TR1) and immediately thereafter "multiple" pulses of light of another wavelength W3 [nm] (within a predetermined temporal range TR2).

Variation

It is noted that while only one LN crystal substrate 142 is provided in the second embodiment, LN crystal substrates may be provided for each traveling light beam propagating therethrough in a variation.

Figure 14:
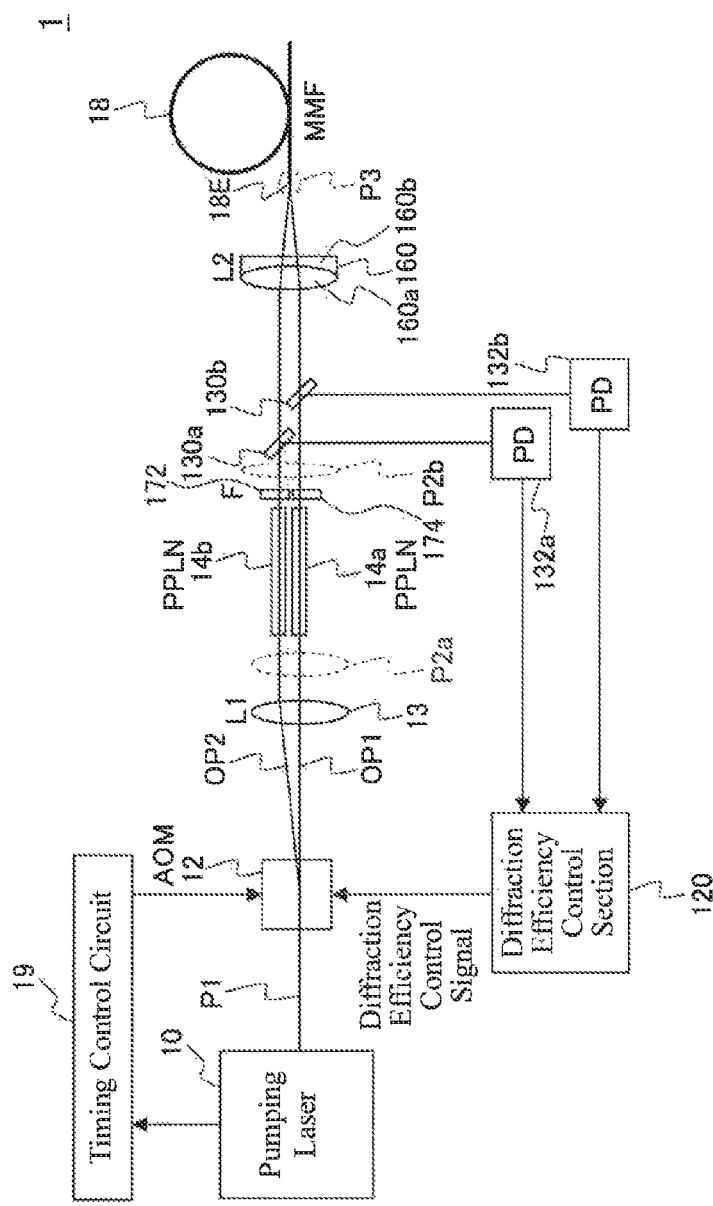
FIG. 14 shows a configuration of a laser beam output apparatus 1 according to a variation of the second embodiment.

FIG. 14 shows a configuration of a laser beam output apparatus 1 according to a variation of the second embodiment. Differences from the second embodiment are wavelength changing sections (PPLN) 14a, 14b. The rest is identical to those in the second embodiment, and the description thereof will be omitted.

The wavelength changing section (PPLN) 14a is arranged to receive, from the acousto-optical modulator 12 via the convex lens 13, ones (wavelength W1 [nm]) of the second pulses P2a traveling through the optical path OP1 and only convert ones exceeding the oscillation threshold value into second pulses P2b (wavelength W2 [nm]). The arrangement of the wavelength changing section 14a corresponds to the polarization reversed sections 144 arranged at the predetermined spacing D1 and the LN crystal substrate 142 in which the polarization reversed sections 144 are formed as shown in FIG. 13.

The wavelength changing section (PPLN) 14b is arranged to receive from the acousto-optical modulator 12 via the convex lens 13 ones (wavelength W1 [nm]) of the second pulses P2a traveling through the optical path OP2 and only convert ones excessing the oscillation threshold value into second pulses P2b (wavelength W3 [nm]). The arrangement of the wavelength changing section 14b corresponds to the polarization reversed sections 144 arranged at the predetermined spacing D2 and the LN crystal substrate 142 in which the polarization reversed sections 144 are formed as shown in FIG. 13.

It is noted that the LN crystal substrate that the wavelength changing section 14a has is not identical to the LN crystal substrate that the wavelength changing section 14b has. That is, the LN crystal substrate that the wavelength changing section 14a has and the LN crystal substrate that the wavelength changing section 14b has are provided, respectively, for the outputs from the convex lens 13 (traveling through the optical path OP1 and the optical path OP2) that propagate therethrough.

In accordance with the variation of the second embodiment, the LN crystal substrates are provided, respectively, for the light beams (traveling through the optical path OP1 and the optical path OP2) that propagate therethrough, whereby conditions of manufacture for the polarization reversed sections 144 can be set according to the predetermined spacing D1, D2, which makes it easy to manufacture the wavelength changing sections 14a, 14b.

Third Embodiment

The laser beam output apparatus 1 according to the first and second embodiments is provided with two optical paths (optical paths OP1 and OP2). Accordingly, third pulses of the two wavelengths W2 and W3 are output through the other end of the optical fiber 18.

There may, however, be more than two optical paths. The laser beam output apparatus 1 according to the third embodiments is provided with three optical paths (optical paths OP1, OP2, and OP3), which is different from the first embodiment. Accordingly, third pulses of the three wavelengths W2, W3, and W4 are output through the other end of the optical fiber 18.

The laser beam output apparatus 1 according to the third embodiment differs from the laser beam output apparatus 1 according to the first embodiment mainly in that two acousto-optical modulators (a first acousto-optical modulator (AOM) 12a and a second acousto-optical modulator (AOM) 12b) are used as optical path determining sections.

Figure 17:
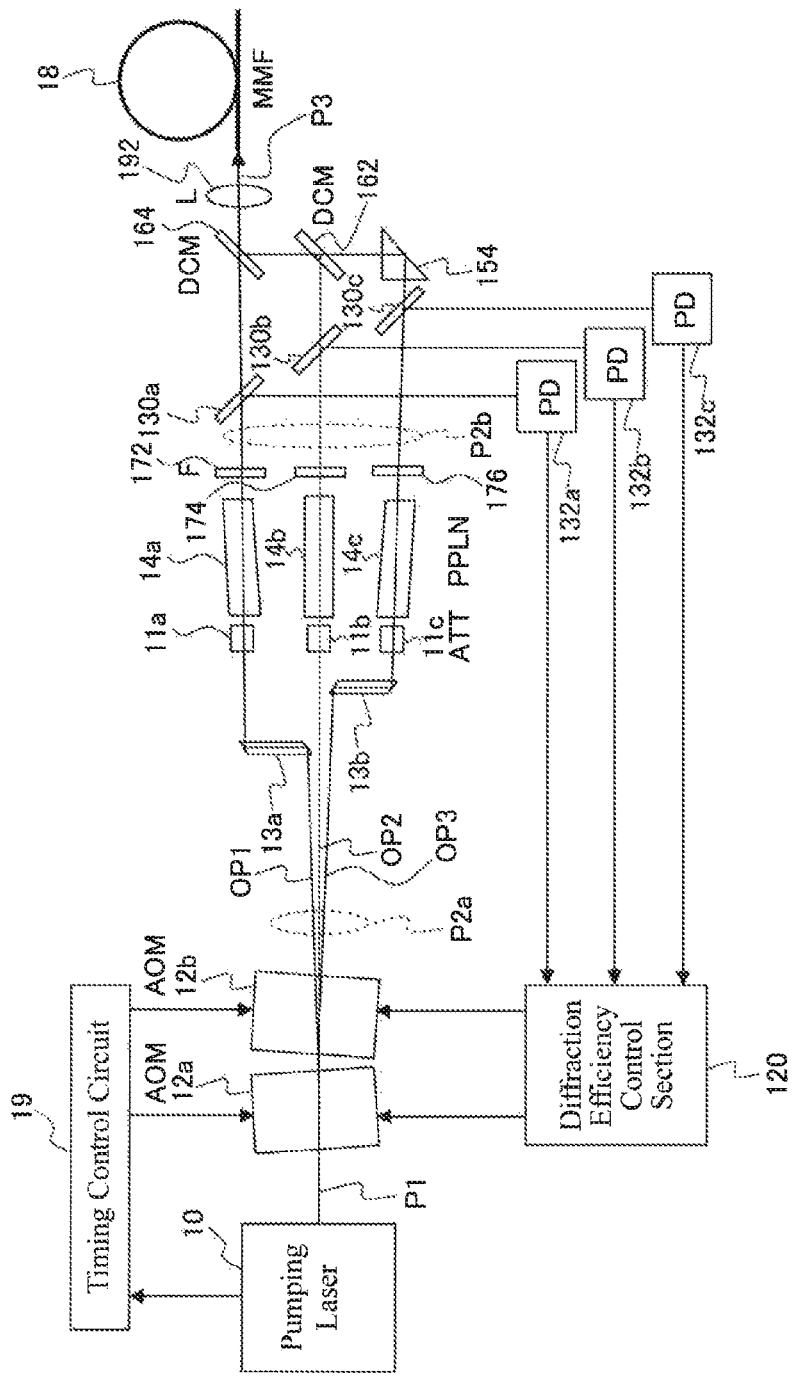
FIG. 17 shows a configuration of the laser beam output apparatus 1 according to the third embodiment.
Figure 18:
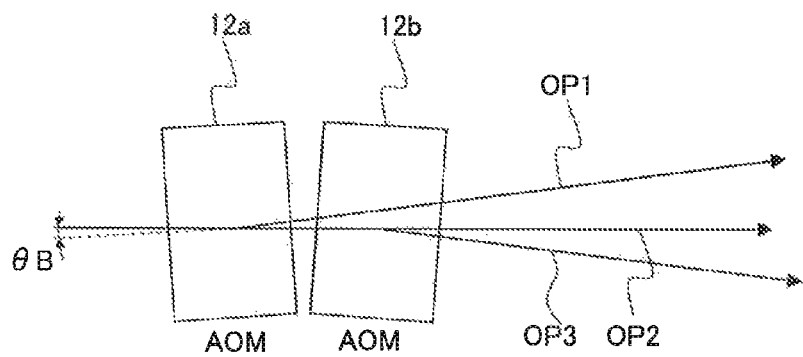
FIG. 18 is an enlarged view around the optical path determining section (the first acousto-optical modulator (AOM) 12a and the second acousto-optical modulator (AOM) 12b) in the laser beam output apparatus 1 according to the third embodiment.

FIG. 17 shows a configuration of the laser beam output apparatus 1 according to the third embodiment. FIG. 18 is an enlarged view around the optical path determining section (the first acousto-optical modulator (AOM) 12a and the second acousto-optical modulator (AOM) 12b) in the laser beam output apparatus 1 according to the third embodiment.

The laser beam output apparatus 1 according to the third embodiment includes a pumping laser (pulsed laser output section) 10, optical attenuators (ATT) 11a, 11b, 11c, a first acousto-optical modulator (AOM) 12a, a second acousto-optical modulator (AOM) 12b, rhomboid prisms 13a, 13b, wavelength changing sections (PPLN) 14a, 14b, 14c, a mirror 154, dichroic mirrors (multiplexers) (DCM) 162, 164, filters (F) 172, 174, 176, an optical fiber (MMF) 18, a timing control circuit (timing control section) 19, a lens (L) 192, a diffraction efficiency control section (power ratio change signal providing section) 120, half mirrors 130a, 130b, 130c, and photodiodes (output measuring sections) (PD) 132a, 132b, 132c. Components identical to those in the first embodiment will hereinafter be designated by the same reference signs to omit the description thereof.

The diffraction efficiency control section (power ratio change signal providing section) 120, the half mirrors 130a, 130b, and the photodiodes (output measuring sections) (PD) 132a, 132b are identical to those in the first embodiment, and the description thereof will be omitted. Note, however, that the diffraction efficiency control section 120 is arranged to change the power P of the diffraction efficiency control signal (magnitude of the power ratio change signal) based on a result of measurement by the photodiodes (output measuring sections) (PD) 132a, 132b, and 132c.

The half mirror 130c is arranged to partially reflect the second pulses (after wavelength conversion) P2b output from the wavelength changing section 14 traveling through the optical path OP3 for output to the photodiode (output measuring section) (PD) 132c.

The photodiode (output measuring section) (PD) 132c is arranged to measure the output from the wavelength changing section 14 received via the half mirror 130c.

The pumping laser (pulsed laser output section) 10, the optical fiber (MMF) 18, and the timing control circuit (timing control section) 19 are identical to those in the first embodiment, and the description thereof will be omitted. Note, however, that the optical fiber (MMF) 18 is arranged to receive, at one end thereof, the third pulses P3 output from the dichroic mirror 164 via the lens (L) 192 for output at the other end thereof. Note further that the timing control circuit 19 is arranged to control the timing of the output from the optical path determining section (the first acousto-optical modulator (AOM) 12a and the second acousto-optical modulator (AOM) 12b).

The mirror 154 is arranged to receive ones of the second pulses (after wavelength conversion) P2b traveling through the optical path OP3 and reflect them toward the dichroic mirror 162.

The dichroic mirror (multiplexer) (DCM) 162 is arranged to multiplex ones of the second pulses (after wavelength conversion) P2b traveling through the optical path OP2 and the reflected light beams from the mirror 154 (ones of the second pulses (after wavelength conversion) P2b traveling through the optical path OP3) and reflect them toward the dichroic mirror 164.

The dichroic mirror (multiplexer) (DCM) 164 is arranged to multiplex ones of the second pulses (after wavelength conversion) P2b traveling through the optical path OP1 and the light beams from the dichroic mirror 162 (multiplexing of ones of the second pulses (after wavelength conversion) P2b traveling through the optical path OP2 and the optical path OP3) and output third pulses P3 having a predetermined frequency 2 kHz).

The optical path determining section has the first acousto-optical modulator (AOM) 12a and the second acousto-optical modulator (AOM) 12b. Both the first acousto-optical modulator (AOM) 12a and the second acousto-optical modulator (AOM) 12b have a rectangular planar shape.

One of the longer sides of the first acousto-optical modulator (AOM) 12a receives the first pulses P1. The shorter sides of the first acousto-optical modulator (AOM) 12a are inclined θB (Bragg's angle) counterclockwise with respect to the optical path OP2.

One of the longer sides of the second acousto-optical modulator (AOM) 12b receives the output from the first acousto-optical modulator (AOM) 12a. The shorter sides of the second acousto-optical modulator (AOM) 12b are inclined θB (Bragg's angle) clockwise with respect to the optical path OP2.

The first acousto-optical modulator (AOM) 12a is arranged to receive the first pulses P1 and determine one or more among multiple optical paths OP1, OP2 for each of the first pulses P1 for output. In the third embodiment, the first acousto-optical modulator (AOM) 12a is arranged to diffract (optical path OP1) (in the case where the diffraction efficiency η>0; however, pulses with the power lower than the oscillation threshold value are also output through the optical path OP2) or directly advance (optical path OP2) (in the case where the diffraction efficiency η=0) each of the first pulses P1 for output.

The second acousto-optical modulator (AOM) 12b is arranged to receive the output from the first acousto-optical modulator 12a and determine one or more among one or more optical paths OP1, OP2, OP3 for each of the pulses of the output from the first acousto-optical modulator 12a for output. In the third embodiment, the second acousto-optical modulator (AOM) 12b is arranged to receive and diffract (optical path OP3) (in the case where the diffraction efficiency η>0; however, pulses with the power lower than the oscillation threshold value are also output through the optical path OP2) or directly advance (optical path OP2) (in the case where the diffraction efficiency η=0) the directly advanced ones (optical path OP2) of the first pulses for output, while receive and directly advance (optical path OP1) (the diffraction efficiency η=0) the diffracted ones (optical path OP1) of the first pulses for output.

The optical path determining section (the first acousto-optical modulator (AOM) 12*a* and the second acousto-optical modulator (AOM) 12*b*) are thus arranged to receive the first pulses P1 and determine one or more among the three optical paths OP1, OP2, OP3 for each of the first pulses P1 for output.

For example, with reference to FIG. 18, at the time the optical path determining section receives (1+3N)-numbered (1st, 4th, 7th . . . ) ones (where N represents an integer equal to or greater than 0) of the first pulses P1, an acoustic wave is provided to the first acousto-optical modulator (AOM) 12*a*, while no acoustic wave is provided to the second acousto-optical modulator (AOM) 12*b*. The (1+3N)-numbered ones of the first pulses P1 then travel through the optical path OP1 (see FIG. 18) (pulses with the power lower than the oscillation threshold value are also output through the optical path OP2).

At the time the optical path determining section receives (2+3N)-numbered (2nd, 5th, 8th . . . ) ones of the first pulses P1, no acoustic wave is provided to the first acousto-optical modulator (AOM) 12*a* or the second acousto-optical modulator (AOM) 12*b*. The (2+3N)-numbered ones of the first pulses P1 then travel through the optical path OP2 (see FIG. 18).

At the time the optical path determining section receives (3+3N)-numbered (3rd, 6th, 9th . . . ) ones of the first pulses P1, no acoustic wave is provided to the first acousto-optical modulator (AOM) 12*a*, while an acoustic wave is provided to the second acousto-optical modulator (AOM) 12*b*. The (3+3N)-numbered ones of the first pulses P1 then travel through the optical path OP3 (see FIG. 18) (pulses with the power lower than the oscillation threshold value are also output through the optical path OP2).

This causes the optical path determining section to output, respectively on the three optical paths OP1, OP2, OP3, second pulses (before wavelength conversion) P2*a* having a frequency (⅔ kHz) obtained by dividing the predetermined frequency (e.g. 2 kHz) by the number (three) of the multiple optical paths and having their respective 120-degree different phases (where pulses with the power lower than the oscillation threshold value are ignored).

This allows the optical path determining section (the first acousto-optical modulator (AOM) 12*a* and the second acousto-optical modulator (AOM) 12*b*) to (1) change the power ratio between the first power of the light beam traveling through one of two (optical paths OP1, OP2) among the three optical paths OP1, OP2, OP3 and the second power of the light beam traveling through the other one by changing the diffraction efficiency of the first acousto-optical modulator (AOM) 12*a* and (2) change the power ratio between the first power of the light beam traveling through one of two (optical paths OP2, OP3) among the three optical paths OP1, OP2, OP3 and the second power of the light beam traveling through the other one by changing the diffraction efficiency of the second acousto-optical modulator (AOM) 12*b*.

The rhomboid prism 13*a* is arranged to receive ones of the second pulses (before wavelength conversion) P2*a* traveling through the optical path OP1 and change the optical path in parallel away from the optical path OP1. The rhomboid prism 13*b* is arranged to receive ones of the second pulses (before wavelength conversion) P2*a* traveling through the optical path OP3 and change the optical path in parallel away from the optical path OP3.

The optical attenuators (ATT) 11*a*, 11*b*, 11*c* are arranged to attenuate therethrough, respectively, the light beams traveling through the optical path OP1 (output from the rhomboid prism 13*a*), the light beams traveling through the optical path OP2, and the light beams traveling through the optical path OP3 (output from the rhomboid prism 13*b*) and provide them, respectively, to the wavelength changing sections (PPLN) 14*a*, 14*b*, 14*c*.

Since the wavelength changing sections (PPLN) 14*a*, 14*b* are identical to those in the second variation of the first embodiment (see FIG. 5), the description thereof will be omitted.

The wavelength changing section (PPLN) 14*c* is arranged to receive from the rhomboid prism 13*b* ones (wavelength W1 [nm]) of the second pulses P2*a* traveling through the optical path OP3 and only convert ones exceeding the oscillation threshold value into second pulses P2*b* (wavelength W4 [nm]). The arrangement of the wavelength changing section 14*c* corresponds to the polarization reversed sections 144 arranged at the predetermined spacing D2 (where the predetermined spacing D2 should be read D3) and the LN crystal substrate 142 in which the polarization reversed sections 144 are formed as shown in FIG. 2 or 4.

It is noted that the LN crystal substrate that the wavelength changing section 14*a* has, the LN crystal substrate that the wavelength changing section 14*b* has, and the LN crystal substrate that the wavelength changing section 14*c* has are not identical to each other. That is, the LN crystal substrate that the wavelength changing section 14*a* has, the LN crystal substrate that the wavelength changing section 14*b* has, and the LN crystal substrate that the wavelength changing section 14*c* has are provided, respectively, for the light beams (traveling through the optical path OP1, the optical path OP2, and the optical path OP3) that propagate therethrough.

The filters (F) 172, 174, 176 are arranged to remove the pump beam and the idler beam from the outputs from the wavelength changing sections (PPLN) 14*a*, 14*b*, 14*c* for output to the dichroic mirrors (multiplexers) (DCM) 164, 162 and the mirror 154. It is noted that the filters 172, 174, 176 are arranged between the respective half mirrors 130*a*, 130*b*, 130*c* and the wavelength changing sections 14*a*, 14*b*, 14*c* so that neither pump beam nor idler beam enters the photodiodes 132*a*, 132*b*, 132*c*.

The lens (L) 192 is arranged to receive the output from the dichroic mirror (multiplexer) (DCM) 164 and provide it to the optical fiber (MMF) 18.

Next will be described an operation according to the third embodiment.

The pumping laser 10 first outputs a laser beam having a predetermined wavelength W1 [nm] as first pulses P1 having a predetermined frequency (e.g. 2 kHz). The first pulses P1 are provided to the first acousto-optical modulator (AOM) 12*a* of the optical path determining section. The timing control circuit 19 controls the timing of the output from the optical path determining section.

At the time the optical path determining section receives (1+3N)-numbered (1st, 4th, 7th . . . ) ones (where N represents an integer equal to or greater than 0) of the first pulses P1, an acoustic wave is provided to the first acousto-optical modulator (AOM) 12*a*, while no acoustic wave is provided to the second acousto-optical modulator (AOM) 12*b*. The (1+3N)-numbered ones of the first pulses P1 then travel through the optical path OP1 (see FIG. 12). This causes light beams traveling through the optical path OP1 to be second pulses (before wavelength conversion) P2*a* having a frequency (⅔ kHz) obtained by dividing the predetermined frequency (e.g. 2 kHz) by the number (three) of the multiple optical paths (where pulses with the power lower than the oscillation threshold value are ignored).

At the time the optical path determining section receives (2+3N)-numbered (2nd, 5th, 8th . . . ) ones of the first pulses P1, no acoustic wave is provided to the first acousto-optical modulator (AOM) 12a or the second acousto-optical modulator (AOM) 12b. The (2+3N)-numbered ones of the first pulses P1 then travel through the optical path OP2 (see FIG. 12). This causes light beams traveling through the optical path OP2 to be second pulses (before wavelength conversion) P2a having a frequency (⅔ kHz) obtained by dividing the predetermined frequency (e.g. 2 kHz) by the number (three) of the multiple optical paths (where pulses with the power lower than the oscillation threshold value are ignored).

At the time the optical path determining section receives (3+3N)-numbered (3rd, 6th, 9th . . . ) ones of the first pulses P1, no acoustic wave is provided to the first acousto-optical modulator (AOM) 12a, while an acoustic wave is provided to the second acousto-optical modulator (AOM) 12b. The (3+3N)-numbered ones of the first pulses P1 then travel through the optical path OP3 (see FIG. 12). This causes light beams traveling through the optical path OP3 to be second pulses (before wavelength conversion) P2a having a frequency (⅔ kHz) obtained by dividing the predetermined frequency (e.g. 2 kHz) by the number (three) of the multiple optical paths (where pulses with the power lower than the oscillation threshold value are ignored).

In addition, the phase of the light beams traveling through the optical path OP1 (second pulses (before wavelength conversion) P2a) is 120-degree different from the phase of the light beams traveling through the optical path OP2 (second pulses (before wavelength conversion) P2a). The phase of the light beams traveling through the optical path OP2 (second pulses (before wavelength conversion) P2a) is 120-degree different from the phase of the light beams traveling through the optical path OP3 (second pulses (before wavelength conversion) P2a). The phase of the light beams traveling through the optical path OP1 (second pulses (before wavelength conversion) P2a) is 240-degree different from the phase of the light beams traveling through the optical path OP3 (second pulses (before wavelength conversion) P2a).

The light beams traveling through the optical path OP1 (second pulses (before wavelength conversion) P2a, with a wavelength W1 [nm]) undergo a change in the optical path through the rhomboid prism 13a to be attenuated through the optical attenuator (ATT) 11a and provided to the wavelength changing section (PPLN) 14a. Further, the light beams provided to the wavelength changing section (PPLN) 14a propagate through the polarization reserved sections 144, which are arranged at the predetermined spacing D1 in the wavelength changing section 14a, to undergo wavelength conversion into W2 [nm] to be second pulses (after wavelength conversion) P2b, and then undergo removal of the pump beam and the idler beam through the filter (F) 172 to be provided to the dichroic mirror 164.

The light beams traveling through the optical path OP2 (second pulses (before wavelength conversion) P2a, with a wavelength W1 [nm]) are attenuated through the optical attenuator (ATT) 11b and provided to the wavelength changing section (PPLN) 14b. Further, the light beams provided to the wavelength changing section (PPLN) 14b propagate through the polarization reserved sections 144, which are arranged at the predetermined spacing D2 in the wavelength changing section 14b, to undergo wavelength conversion into W3 [nm] to be second pulses (after wavelength conversion) P2b, and then undergo removal of the pump beam and the idler beam through the filter (F) 174 to be reflected by the dichroic mirror 162 and provided to the dichroic mirror 164.

The light beams traveling through the optical path OP3 (second pulses (before wavelength conversion) P2a, with a wavelength W1 [nm]) undergo a change in the optical path through the rhomboid prism 13b to be attenuated through the optical attenuator (ATT) 11c and provided to the wavelength changing section (PPLN) 14c. Further, the light beams provided to the wavelength changing section (PPLN) 14c propagate through the polarization reserved sections 144, which are arranged at the predetermined spacing D3 in the wavelength changing section 14c, to undergo wavelength conversion into W4 [nm] to be second pulses (after wavelength conversion) P2b, and then undergo removal of the pump beam and the idler beam through the filter (F) 176 to be reflected by the mirror 154 and provided to the dichroic mirror 164 via the dichroic mirror 162.

Ones of the second pulses (after wavelength conversion) P2b output from the wavelength changing sections 14a, 14b, 14c and having the wavelength W2 [nm], the wavelength W3 [nm], and the wavelength W4 [nm] are multiplexed through the dichroic mirror 164 to be third pulses P3 having a predetermined frequency (2 kHz).

The third pulses P3 go through the lens (L) 192 and provided to the optical fiber (MMF) 18.

In accordance with the third embodiment, the number of multiple optical paths can be increased to three (optical paths OP1, OP2, OP3). The third pulses P3 thus provides for irradiation with pulsed light of the wavelength W2 [nm] and immediately thereafter (e.g. after 500 microseconds) pulsed light of the different wavelength W3 [nm]. It further provides for irradiation with pulsed light of the wavelength W3 [nm] and immediately thereafter (e.g. after 500 microseconds) pulsed light of the further different wavelength W4 [nm]. That is, the third embodiment allows for irradiation with pulsed light of one wavelength, immediately thereafter pulsed light of another wavelength, and immediately thereafter pulsed light of a further wavelength. The third embodiment thus allows for irradiation with pulsed light of three wavelengths.

Also, in the third embodiment, like the first embodiment, all of the polarization reversed sections 144 may be formed in the single LN crystal substrate 142.

Also, in accordance with the third embodiment, changing the diffraction efficiency of the first acousto-optical modulator (AOM) 12a and thereby increasing the power of the light beam traveling through the optical path OP2 (or OP1) (not to exceed the oscillation threshold value so that nothing is output from the wavelength changing section 14 through the optical path OP2 (or OP1)) allows the power of the light beam traveling through the optical path OP1 (or OP2) to decrease and thereby the output from the wavelength changing section 14 (through the optical path OP1 (or OP2)) to attenuate.

It is noted that in the case of changing the diffraction efficiency of the first acousto-optical modulator (AOM) 12a and thereby decreasing the power of the light beam traveling through the optical path OP2, the power of the light beam traveling through the optical path OP3 can be reduced by fixing the diffraction efficiency of the second acousto-optical modulator (AOM) 12b to its maximum value.

Also, in accordance with the third embodiment, changing the diffraction efficiency of the second acousto-optical modulator (AOM) 12b and thereby increasing the power of the light beam traveling through the optical path OP3 (or OP2) (not to exceed the oscillation threshold value so that nothing is output from the wavelength changing section 14 through the optical path OP3 (or OP2)) allows the power of the light beam traveling through the optical path OP2 (or OP3) to decrease and thereby the output from the wavelength changing section 14 (through the optical path OP2 (or OP3)) to attenuate.

It is noted that the third embodiment may have the following variation as to the operation of the optical path determining section (the first acousto-optical modulator (AOM) 12a and the second acousto-optical modulator (AOM) 12b).

Figure 21:
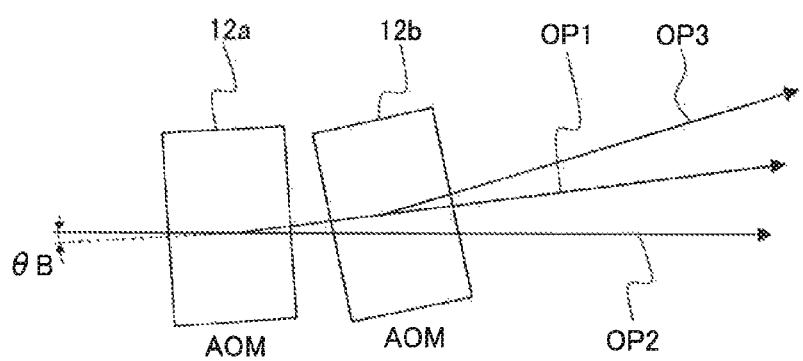
FIG. 21 is an enlarged view around the optical path determining section (the first acousto-optical modulator (AOM) 12a and the second acousto-optical modulator (AOM) 12b) in the laser beam output apparatus 1 according to a variation of the third embodiment.

FIG. 21 is an enlarged view around the optical path determining section (the first acousto-optical modulator (AOM) 12a and the second acousto-optical modulator (AOM) 12b) in the laser beam output apparatus 1 according to a variation of the third embodiment.

The first acousto-optical modulator (AOM) 12a is arranged to receive the first pulses P1 and determine one among multiple optical paths OP1, OP2 for each of the first pulses P1 for output. For example, the first acousto-optical modulator (AOM) 12a is arranged to diffract (optical path OP1) or directly advance (optical path OP2) each of the first pulses P1 for output. These are the same as in the third embodiment.

The second acousto-optical modulator (AOM) 12b is here arranged to receive the output from the first acousto-optical modulator (AOM) 12a and determine one among one or more optical paths OP1, OP2, OP3 for each of the pulses of the output from the first acousto-optical modulator (AOM) 12a for output. In the variation of the third embodiment, the second acousto-optical modulator (AOM) 12b is arranged to receive and directly advance (optical path OP2) ("not diffract", which differs from the third embodiment) the directly advanced ones (optical path OP2) of the first pulses for output, while receive and diffract (optical path OP3) or directly advance (optical path OP1) ("diffract", which differs from the third embodiment) the diffracted ones (optical path OP1) of the first pulses for output.

It is noted that the shorter sides of the second acousto-optical modulator (AOM) 12b are inclined θB (Bragg's angle) counterclockwise with respect to the optical path OP1.

Also, in accordance with the variation of the third embodiment, changing the diffraction efficiency of the first acousto-optical modulator (AOM) 12a and thereby increasing the power of the light beam traveling through the optical path OP2 (or OP1) (not to exceed the oscillation threshold value so that nothing is output from the wavelength changing section 14 through the optical path OP2 (or OP1)) allows the power of the light beam traveling through the optical path OP1 (or OP2) to decrease and thereby the output from the wavelength changing section 14 (through the optical path OP1 (or OP2)) to attenuate.

It is noted that in the case of changing the diffraction efficiency of the first acousto-optical modulator (AOM) 12a and thereby decreasing the power of the light beam traveling through the optical path OP1, the power of the light beam traveling through the optical path OP3 can be reduced by fixing the diffraction efficiency of the second acousto-optical modulator (AOM) 12b to its maximum value.

Also, in accordance with the variation of the third embodiment, changing the diffraction efficiency of the second acousto-optical modulator (AOM) 12b and thereby increasing the power of the light beam traveling through the optical path OP3 (or OP1) (not to exceed the oscillation threshold value so that nothing is output from the wavelength changing section 14 through the optical path OP3 (or OP1)) allows the power of the light beam traveling through the optical path OP1 (or OP3) to decrease and thereby the output from the wavelength changing section 14 (through the optical path OP1 (or OP3)) to attenuate.

It is noted that in the third embodiment and its variation, like the second embodiment, in lieu of the dichroic mirror (multiplexer) (DCM) 16, a convex lens (parallelizing section) (L1) 13 and an achromatic lens (focusing section) (L2) 160 may be included.

Fourth Embodiment

The laser beam output apparatus 1 according to the first and second embodiments is provided with two optical paths (optical paths OP1 and OP2). Accordingly, third pulses of the two wavelengths W2 and W3 are output through the other end of the optical fiber 18.

There may, however, be more than two optical paths. The laser beam output apparatus 1 according to the fourth embodiments is provided with four optical paths (optical paths OP1, OP2, OP3, and OP4), which is different from the first embodiment. Accordingly, third pulses of the four wavelengths W2, W3, W4, and W5 are output through the other end of the optical fiber 18.

The laser beam output apparatus 1 according to the fourth embodiment differs from the laser beam output apparatus 1 according to the third embodiment mainly in that two acousto-optical modulators (a first acousto-optical modulator (AOM) 12a and a second acousto-optical modulator (AOM) 12b) are used, like the third embodiment, for irradiation with pulsed light of four wavelengths.

Figure 19:
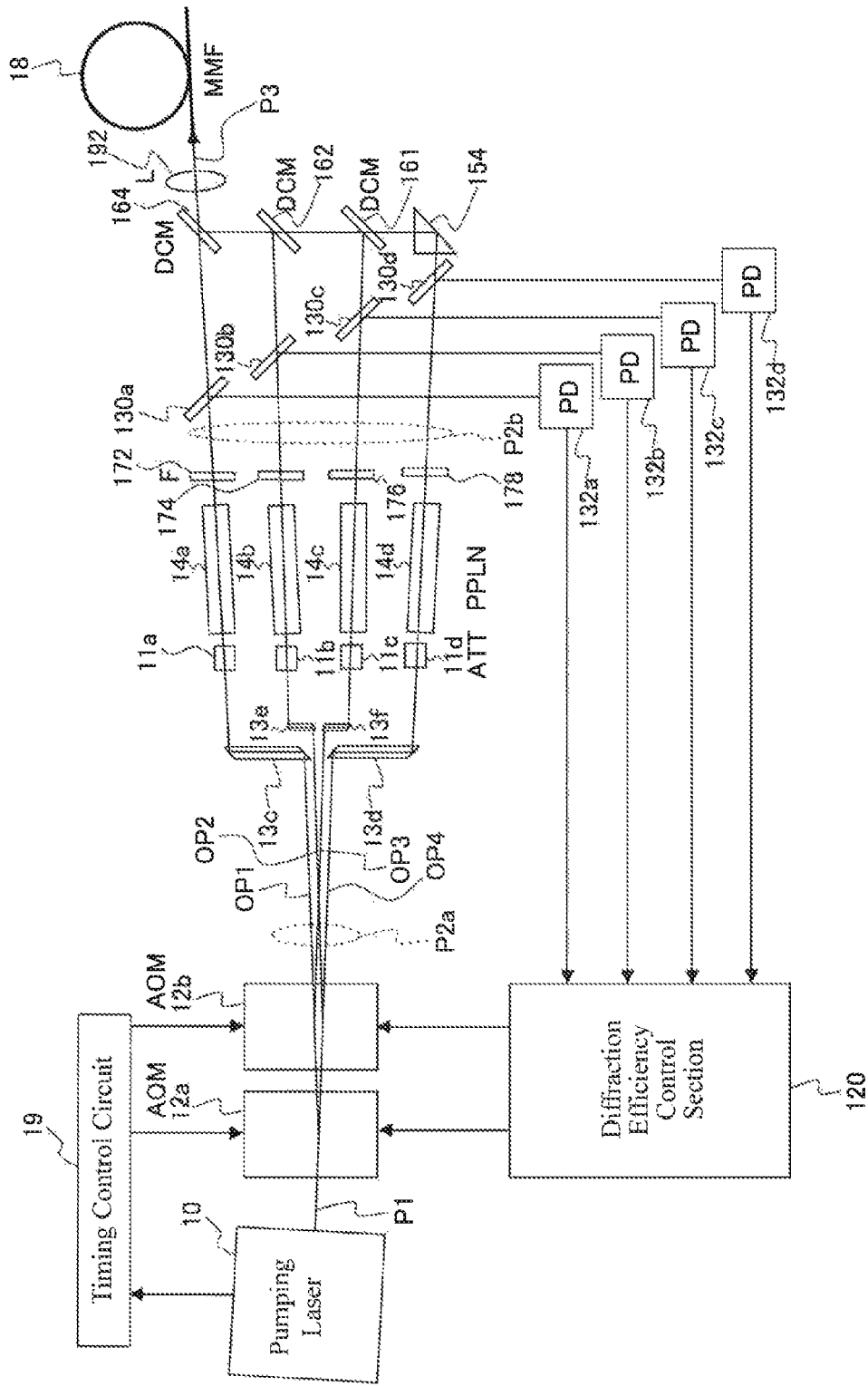
FIG. 19 shows a configuration of the laser beam output apparatus 1 according to the fourth embodiment.
Figure 20:
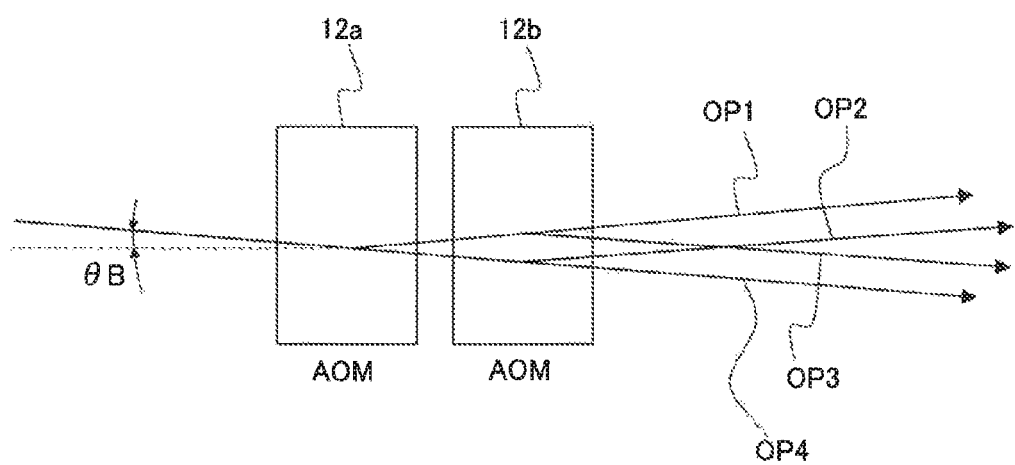
FIG. 20 is an enlarged view around the optical path determining section (the first acousto-optical modulator (AOM) 12a and the second acousto-optical modulator (AOM) 12b) in the laser beam output apparatus 1 according to the fourth embodiment.

FIG. 19 shows a configuration of the laser beam output apparatus 1 according to the fourth embodiment. FIG. 20 is an enlarged view around the optical path determining section (the first acousto-optical modulator (AOM) 12a and the second acousto-optical modulator (AOM) 12b) in the laser beam output apparatus 1 according to the fourth embodiment.

The laser beam output apparatus 1 according to the fourth embodiment includes a pumping laser (pulsed laser output section) 10, optical attenuators (ATT) 11a, 11b, 11c, 11d, a first acousto-optical modulator (AOM) 12a, a second acousto-optical modulator (AOM) 12b, rhomboid prisms 13c, 13d, 13e, 13f, wavelength changing sections (PPLN) 14a, 14b, 14c, 14d, a mirror 154, dichroic mirrors (multiplexers) (DCM) 161, 162, 164, filters (F) 172, 174, 176, 178, an optical fiber (MMF) 18, a timing control circuit (timing control section) 19, a lens (L) 192, a diffraction efficiency control section (power ratio change signal providing section) 120, half mirrors 130a, 130b, 130c, 130d, and photodiodes (output measuring sections) (PD) 132a, 132b, 132c, 132d. Components identical to those in the third embodiment will hereinafter be designated by the same reference signs to omit the description thereof.

The diffraction efficiency control section (power ratio change signal providing section) 120, the half mirrors 130a, 130b, 130c, and the photodiodes (output measuring sections) (PD) 132a, 132b, 132c are identical to those in the third embodiment, and the description thereof will be omitted. Note, however, that the diffraction efficiency control section 120 is arranged to change the power P of the diffraction efficiency control signal (magnitude of the power ratio change signal) based on a result of measurement by the photodiodes (output measuring sections) (PD) 132a, 132b, 132c, and 132d.

The half mirror 130d is arranged to partially reflect the second pulses (after wavelength conversion) P2b output from the wavelength changing section 14 traveling through the optical path OP4 for output to the photodiode (output measuring section) (PD) 132d.

The photodiode (output measuring section) (PD) 132d is arranged to measure the output from the wavelength changing section 14 received via the half mirror 130d.

The pumping laser (pulsed laser output section) 10, the optical attenuators (ATT) 11a, 11b, 11c, the wavelength changing sections (PPLN) 14a, 14b, 14c, the mirror 154, the dichroic mirrors (multiplexers) (DCM) 162, 164, the filters (F) 172, 174, 176, the optical fiber (MMF) 18, the timing control circuit (timing control section) 19, and the lens (L) 192 are identical to those in the third embodiment, and the description thereof will be omitted.

Note, however, that the mirror 154 is arranged to receive ones of the second pulses (after wavelength conversion) P2b traveling through the optical path OP4 and reflect them toward the dichroic mirror 161. The dichroic mirror (multiplexer) (DCM) 162 is arranged to multiplex ones of the second pulses (after wavelength conversion) P2b traveling through the optical path OP2 and the reflected light beams from the dichroic mirror 161 and reflect them toward the dichroic mirror 164. The filter (F) 176 is arranged to remove the pump beam and the idler beam from the output from the wavelength changing section (PPLN) 14c for output to the dichroic mirror (multiplexer) (DCM) 161.

The filter (F) 178 is arranged to remove the pump beam and the idler beam from the output from the wavelength changing section (PPLN) 14d for output to the mirror 154. It is noted that the filter 178 is arranged between the half mirror 130d and the wavelength changing section 14d so that neither pump beam nor idler beam enters the photodiode 132d.

The optical path determining section has the first acousto-optical modulator (AOM) 12a and the second acousto-optical modulator (AOM) 12b. Both the first acousto-optical modulator (AOM) 12a and the second acousto-optical modulator (AOM) 12b have a rectangular planar shape.

The longer sides of the first acousto-optical modulator (AOM) 12a and the longer sides of the second acousto-optical modulator (AOM) 12b are in parallel to each other. It is noted that the optical path OP4 is inclined θB (Bragg's angle) clockwise with respect to the shorter sides of the first acousto-optical modulator (AOM) 12a. One of the longer sides of the first acousto-optical modulator (AOM) 12a receives the first pulses P1, while one of the longer sides of the second acousto-optical modulator (AOM) 12b receives the output from the first acousto-optical modulator 12a.

The first acousto-optical modulator (AOM) 12a is arranged to receive the first pulses P1 and determine one or more among multiple optical paths OP1, OP4 for each of the first pulses P1 for output. In the fourth embodiment, the first acousto-optical modulator (AOM) 12a is arranged to diffract (optical path OP1) (in the case where the diffraction efficiency η>0; however, pulses with the power lower than the oscillation threshold value are also output through the optical path OP4) or directly advance (optical path OP4) (in the case where the diffraction efficiency η=0) each of the first pulses P1 for output.

The second acousto-optical modulator (AOM) 12b is arranged to receive the output from the first acousto-optical modulator 12a and determine one or more among one or more optical paths OP1, OP2, OP3, OP4 for each of the pulses of the output from the first acousto-optical modulator 12a for output. In the fourth embodiment, the second acousto-optical modulator (AOM) 12b is arranged to diffract (optical paths OP2, OP3) (in the case where the diffraction efficiency η>0; however, pulses with the power lower than the oscillation threshold value are also output through the optical paths OP1, OP4) or directly advance (optical paths OP1, OP4) (in the case where the diffraction efficiency η=0) each of the pulses output from the first acousto-optical modulator (AOM) 12a for output. In more detail, the second acousto-optical modulator (AOM) 12b is arranged to receive and diffract (optical path OP2) (in the case where the diffraction efficiency η>0; however, pulses with the power lower than the oscillation threshold value are also output through the optical path OP4) or directly advance (optical path OP4) (in the case where the diffraction efficiency η=0) the directly advanced ones (optical path OP4) of the first pulses for output, while receive and diffract (optical path OP3) (in the case where the diffraction efficiency η>0; however, pulses with the power lower than the oscillation threshold value are also output through the optical path OP1) or directly advance (optical path OP1) (the diffraction efficiency η=0) the diffracted ones (optical path OP1) of the first pulses for output.

The optical path determining section (the first acousto-optical modulator (AOM) 12a and the second acousto-optical modulator (AOM) 12b) are thus arranged to receive the first pulses P1 and determine one or more among the four optical paths OP1, OP2, OP3, OP4 for each of the first pulses P1 for output.

At the time the optical path determining section receives (1+4N)-numbered (1st, 5th, 9th . . . ) ones (where N represents an integer equal to or greater than 0) of the first pulses P1, an acoustic wave is provided to the first acousto-optical modulator (AOM) 12a, while no acoustic wave is provided to the second acousto-optical modulator (AOM) 12b. The (1+4N)-numbered ones of the first pulses P1 then travel through the optical path OP1 (see FIG. 20) (pulses with the power lower than the oscillation threshold value are also output through the optical path OP4).

At the time the optical path determining section receives (2+4N)-numbered (2nd, 6th, 10th . . . ) ones of the first pulses P1, no acoustic wave is provided to the first acousto-optical modulator (AOM) 12a, while an acoustic wave is provided to the second acousto-optical modulator (AOM) 12b. The (2+4N)-numbered ones of the first pulses P1 then travel through the optical path OP2 (see FIG. 20) (pulses with the power lower than the oscillation threshold value are also output through the optical path OP4).

At the time the optical path determining section receives (3+4N)-numbered (3rd, 7th, 11th . . . ) ones of the first pulses P1, an acoustic wave is provided to the first acousto-optical modulator (AOM) 12a and an acoustic wave is also provided to the second acousto-optical modulator (AOM) 12b. The (3+4N)-numbered ones of the first pulses P1 then travel through the optical path OP3 (see FIG. 20) (pulses with the power lower than the oscillation threshold value are also output through the optical paths OP4, OP1).

At the time the optical path determining section receives (4+4N)-numbered (4th, 8th, 12th . . . ) ones of the first pulses P1, no acoustic wave is provided to the first acousto-optical modulator (AOM) 12a and no acoustic wave is also provided to the second acousto-optical modulator (AOM) 12b. The (4+4N)-numbered ones of the first pulses P1 then travel through the optical path OP4 (see FIG. 20).

This causes the optical path determining section to output, respectively on the four optical paths OP1, OP2, OP3, OP4, second pulses (before wavelength conversion) P2a having a frequency (½ kHz) obtained by dividing the predetermined frequency (e.g. 2 kHz) by the number (four) of the multiple optical paths and having their respective 90-degree different phases (where pulses with the power lower than the oscillation threshold value are ignored).

This allows the optical path determining section (the first acousto-optical modulator (AOM) 12a and the second acousto-optical modulator (AOM) 12b) to (1) change the power ratio between the first power of the light beam traveling through one of two (optical paths OP1, OP4) among the four optical paths OP1, OP2, OP3, OP4 and the second power of the light beam traveling through the other one by changing the diffraction efficiency of the first acousto-optical modulator (AOM) 12a and (2) change the power ratio between the first power of the light beam traveling through one of two ((optical paths OP1, OP3) or (optical paths OP2, OP4)) among the four optical paths OP1, OP2, OP3, OP4 and the second power of the light beam traveling through the other one by changing the diffraction efficiency of the second acousto-optical modulator (AOM) 12b.

The rhomboid prism 13c is arranged to receive ones of the second pulses (before wavelength conversion) P2a traveling through the optical path OP1 and change the optical path in parallel away from the optical path OP1. The rhomboid prism 13e is arranged to receive ones of the second pulses (before wavelength conversion) P2a traveling through the optical path OP2 and change the optical path in parallel away from the optical path OP2. The rhomboid prism 13f is arranged to receive ones of the second pulses (before wavelength conversion) P2a traveling through the optical path OP3 and change the optical path in parallel away from the optical path OP3. The rhomboid prism 13d is arranged to receive ones of the second pulses (before wavelength conversion) P2a traveling through the optical path OP4 and change the optical path in parallel away from the optical path OP4.

The optical attenuator (ATT) 11d is arranged to attenuate therethrough the light beams traveling through the optical path OP4 (output from the rhomboid prism 13d) and provide them to the wavelength changing section (PPLN) 14d.

The wavelength changing section (PPLN) 14d is arranged to receive from the rhomboid prism 13d ones (wavelength W1 [nm]) of the second pulses P2a traveling through the optical path OP4 and only convert ones exceeding the oscillation threshold value into second pulses P2b (wavelength W5 [nm]). The arrangement of the wavelength changing section 14d corresponds to the polarization reversed sections 144 arranged at the predetermined spacing D2 (where the predetermined spacing D2 should be read D4, which differs from D1, D2, and D3) and the LN crystal substrate 142 in which the polarization reversed sections 144 are formed as shown in FIG. 2 or 4.

It is noted that the LN crystal substrate that the wavelength changing section 14a has, the LN crystal substrate that the wavelength changing section 14b has, the LN crystal substrate that the wavelength changing section 14c has, and the LN crystal substrate that the wavelength changing section 14d has are not identical to each other. That is, the LN crystal substrate that the wavelength changing section 14a has, the LN crystal substrate that the wavelength changing section 14b has, the LN crystal substrate that the wavelength changing section 14c has, and the LN crystal substrate that the wavelength changing section 14d has are provided, respectively, for the light beams (traveling through the optical path OP1, the optical path OP2, the optical path OP3, and the optical path OP4) that propagate therethrough.

Next will be described an operation according to the fourth embodiment.

The pumping laser 10 first outputs a laser beam having a predetermined wavelength W1 [nm] as first pulses P1 having a predetermined frequency (e.g. 2 kHz). The first pulses P1 are provided to the first acousto-optical modulator (AOM) 12a of the optical path determining section. The timing control circuit 19 controls the timing of the output from the optical path determining section.

At the time the optical path determining section receives (1+4N)-numbered (1st, 5th, 9th . . . ) ones (where N represents an integer equal to or greater than 0) of the first pulses P1, an acoustic wave is provided to the first acousto-optical modulator (AOM) 12a, while no acoustic wave is provided to the second acousto-optical modulator (AOM) 12b. The (1+4N)-numbered ones of the first pulses P1 then travel through the optical path OP1 (see FIG. 14). This causes light beams traveling through the optical path OP1 to be second pulses (before wavelength conversion) P2a having a frequency (½ kHz) obtained by dividing the predetermined frequency (e.g. 2 kHz) by the number (four) of the multiple optical paths (where pulses with the power lower than the oscillation threshold value are ignored).

At the time the optical path determining section receives (2+4N)-numbered (2nd, 6th, 10th . . . ) ones of the first pulses P1, no acoustic wave is provided to the first acousto-optical modulator (AOM) 12a, while an acoustic wave is provided to the second acousto-optical modulator (AOM) 12b. The (2+4N)-numbered ones of the first pulses P1 then travel through the optical path OP2 (see FIG. 14). This causes light beams traveling through the optical path OP2 to be second pulses (before wavelength conversion) P2a having a frequency (½ kHz) obtained by dividing the predetermined frequency (e.g. 2 kHz) by the number (four) of the multiple optical paths (where pulses with the power lower than the oscillation threshold value are ignored).

At the time the optical path determining section receives (3+4N)-numbered (3rd, 7th, 11th . . . ) ones of the first pulses P1, an acoustic wave is provided to the first acousto-optical modulator (AOM) 12a and an acoustic wave is also provided to the second acousto-optical modulator (AOM) 12b. The (3+4N)-numbered ones of the first pulses P1 then travel through the optical path OP3 (see FIG. 14). This causes light beams traveling through the optical path OP3 to be second pulses (before wavelength conversion) P2a having a frequency (½ kHz) obtained by dividing the predetermined frequency (e.g. 2 kHz) by the number (four) of the multiple optical paths (where pulses with the power lower than the oscillation threshold value are ignored).

At the time the optical path determining section receives (4+4N)-numbered (4th, 8th, 12th . . . ) ones of the first pulses P1, no acoustic wave is provided to the first acousto-optical modulator (AOM) 12a and no acoustic wave is also provided to the second acousto-optical modulator (AOM) 12b. The (4+4N)-numbered ones of the first pulses P1 then travel through the optical path OP4 (see FIG. 14). This causes light beams traveling through the optical path OP4 to be second pulses (before wavelength conversion) P2a having a frequency (½ kHz) obtained by dividing the predetermined frequency (e.g. 2 kHz) by the number (four) of the multiple optical paths.

In addition, the phase of the light beams traveling through the optical path OP1 (second pulses (before wavelength conversion) P2a), the phase of the light beams traveling through the optical path OP2 (second pulses (before wavelength conversion) P2a), the phase of the light beams traveling through the optical path OP3 (second pulses (before wavelength conversion) P2a), and the phase of the light beams traveling through the optical path OP4 (second pulses (before wavelength conversion) P2a) are 90-degree different from each other.

The light beams traveling through the optical path OP1 (second pulses (before wavelength conversion) P2a, with a wavelength W1 [nm]) undergo a change in the optical path through the rhomboid prism 13c to be attenuated through the optical attenuator (ATT) 11a and provided to the wavelength changing section (PPLN) 14a. Further, the light beams provided to the wavelength changing section (PPLN) 14a propagate through the polarization reserved sections 144, which are arranged at the predetermined spacing D1 in the wavelength changing section 14a, to undergo wavelength conversion into W2 [nm] to be second pulses (after wavelength conversion) P2b, and then undergo removal of the pump beam and the idler beam through the filter (F) 172 to be provided to the dichroic mirror 164.

The light beams traveling through the optical path OP2 (second pulses (before wavelength conversion) P2a, with a wavelength W1 [nm]) undergo a change in the optical path through the rhomboid prism 13e to be attenuated through the optical attenuator (ATT) 11b and provided to the wavelength changing section (PPLN) 14b. Further, the light beams provided to the wavelength changing section (PPLN) 14b propagate through the polarization reserved sections 144, which are arranged at the predetermined spacing D2 in the wavelength changing section 14b, to undergo wavelength conversion into W3 [nm] to be second pulses (after wavelength conversion) P2b, and then undergo removal of the pump beam and the idler beam through the filter (F) 174 to be reflected by the dichroic mirror 162 and provided to the dichroic mirror 164.

The light beams traveling through the optical path OP3 (second pulses (before wavelength conversion) P2a, with a wavelength W1 [nm]) undergo a change in the optical path through the rhomboid prism 13f to be attenuated through the optical attenuator (ATT) 11c and provided to the wavelength changing section (PPLN) 14c. Further, the light beams provided to the wavelength changing section (PPLN) 14c propagate through the polarization reserved sections 144, which are arranged at the predetermined spacing D3 in the wavelength changing section 14c, to undergo wavelength conversion into W4 [nm] to be second pulses (after wavelength conversion) P2b, and then undergo removal of the pump beam and the idler beam through the filter (F) 176 to be reflected by the dichroic mirror 161 and provided to the dichroic mirror 164 via the dichroic mirror 162.

The light beams traveling through the optical path OP4 (second pulses (before wavelength conversion) P2a, with a wavelength W1 [nm]) undergo a change in the optical path through the rhomboid prism 13d to be attenuated through the optical attenuator (ATT) 11d and provided to the wavelength changing section (PPLN) 14d. Further, the light beams provided to the wavelength changing section (PPLN) 14d propagate through the polarization reserved sections 144, which are arranged at the predetermined spacing D4 in the wavelength changing section 14d, to undergo wavelength conversion into W5 [nm] to be second pulses (after wavelength conversion) P2b, and then undergo removal of the pump beam and the idler beam through the filter (F) 178 to be reflected by the mirror 154 and provided to the dichroic mirror 164 via the dichroic mirrors 161, 162.

Ones of the second pulses (after wavelength conversion) P2b output from the wavelength changing sections 14a, 14b, 14c, 14d and having the wavelength W2 [nm], the wavelength W3 [nm], the wavelength W4 [nm], and the wavelength W5 [nm] are multiplexed through the dichroic mirror 164 to be third pulses P3 having a predetermined frequency (2 kHz).

The third pulses P3 go through the lens (L) 192 and provided to the optical fiber (MMF) 18.

In accordance with the fourth embodiment, using the two acousto-optical modulators (the first acousto-optical modulator (AOM) 12a and the second acousto-optical modulator (AOM) 12b), as is the case in the third embodiment, allows for irradiation with pulsed light of four wavelengths, the number being larger than that in the third embodiment.

Also, in the fourth embodiment, like the third embodiment, all of the polarization reversed sections 144 may be formed in the single LN crystal substrate 142.

Also, in accordance with the fourth embodiment, changing the diffraction efficiency of the first acousto-optical modulator (AOM) 12a and thereby increasing the power of the light beam traveling through the optical path OP4 (or OP1) (not to exceed the oscillation threshold value so that nothing is output from the wavelength changing section 14 through the optical path OP4 (or OP1)) allows the power of the light beam traveling through the optical path OP1 (or OP4) to decrease and thereby the output from the wavelength changing section 14 (through the optical path OP1 (or OP4)) to attenuate.

It is noted that in the case of changing the diffraction efficiency of the first acousto-optical modulator (AOM) 12a and thereby decreasing the power of the light beam traveling through the optical path OP1 (or OP4), the power of the light beam traveling through the optical path OP3 (or OP2) can be reduced by fixing the diffraction efficiency of the second acousto-optical modulator (AOM) 12b to its maximum value.

Also, in accordance with the fourth embodiment, changing the diffraction efficiency of the second acousto-optical modulator (AOM) 12b and thereby increasing the power of the light beam traveling through the optical path OP3 (or OP1) (not to exceed the oscillation threshold value so that nothing is output from the wavelength changing section 14 through the optical path OP3 (or OP1)) allows the power of the light beam traveling through the optical path OP1 (or OP3) to decrease and thereby the output from the wavelength changing section 14 (through the optical path OP1 (or OP3)) to attenuate.

Also, in accordance with the fourth embodiment, changing the diffraction efficiency of the second acousto-optical modulator (AOM) 12b and thereby increasing the power of the light beam traveling through the optical path OP4 (or OP2) (not to exceed the oscillation threshold value so that nothing is output from the wavelength changing section 14 through the optical path OP4 (or OP2)) allows the power of the light beam traveling through the optical path OP2 (or OP4) to decrease and thereby the output from the wavelength changing section 14 (through the optical path OP2 (or OP4)) to attenuate.

It is noted that in the fourth embodiment, like the second embodiment, in lieu of the dichroic mirror (multiplexer) (DCM) 16, a convex lens (parallelizing section) (L1) 13 and an achromatic lens (focusing section) (L2) 160 may be included.

DESCRIPTION OF REFERENCE NUMERAL $\eta$ Diffraction Efficiency
P1 First Pulse
P2a Second Pulse (before wavelength conversion)
P2b Second pulse (after wavelength conversion)

P3 Third Pulse
OP1, OP2 Optical Path
1 Laser Beam Output Apparatus
10 Pumping Laser (Pulsed Laser Output Section)
12 Acousto-Optical Modulator (Optical Path Determining Section) (AOM)
12a First Acousto-Optical Modulator (AOM)
12b Second Acousto-Optical Modulator (AOM)
120 Diffraction Efficiency Control Section
13 Convex Lens (Parallelizing Section) (L1)
131 Rhomboid Prism
130a, 130b Half Mirror
132a, 132b Photodiodes (Output Measuring Sections) (PD)
14, 14a, 14b Wavelength Changing Section (PPLN)
142 LN Crystal Substrate
144 Polarization Reversed Sections
15 Mirror
16 Dichroic Mirror (Multiplexer) (DCM)
160 Achromatic Lens (Focusing Section) (L2)
160a Convex Lens
160b Concave Lens
172, 174, 176, 178 Filters (F)
18 Optical Fiber (MMF)
19 Timing Control Circuit (Timing Control Section)

What is claimed is:

1. A laser beam output apparatus comprising:
a pulsed laser output section that outputs a laser beam having a predetermined wavelength as pulses;
an optical path determining section that receives the first pulses and determines one or more among two or more optical paths for each of the pulses for output;
a wavelength changing section that receives light beams travelling, respectively, through the two or more optical paths, and, when the power of the traveling light beams exceeds a threshold value, changes the wavelengths of the light beams for output; and
a multiplexer that multiplexes outputs from the wavelength changing section, wherein
the optical path determining section is arranged to allow for change in the power ratio between a first power of the light beam traveling through one of two among the two or more optical paths and a second power of the light beam traveling through the other of the two optical paths, and
wherein the threshold value is defined for each of the optical paths.

2. The laser beam output apparatus according to claim 1, wherein
the optical path determining section is arranged such that:
the power of the light beam traveling through any one of the optical paths only exceeds the threshold value;
when the first power exceeds the threshold value, the power ratio is allowed to have two or more levels; and
when the second power also exceeds the threshold value, the power ratio is allowed to have two or more levels.

3. The laser beam output apparatus according to claim 1, wherein
the optical path determining section comprises a power ratio change signal providing section that provides a power ratio change signal for changing the power ratio, and
the optical path determining section is an acousto-optical modulator.

4. The laser beam output apparatus according to claim 3, wherein
the power ratio change signal providing section has:
a carrier wave source that outputs a carrier wave;
a mixer that mixes the carrier wave and a voltage-variable modulation signal to output a modulated signal; and
an amplitude changer that changes the amplitude of the modulated signal to output the power ratio change signal.

5. The laser beam output apparatus according to claim 3, further comprising an output measuring section that measures the output of the wavelength changing section, wherein
the power ratio change signal providing section is arranged to change the magnitude of the power ratio change signal based on a result of measurement by the output measuring section.

6. The laser beam output apparatus according to claim 1, wherein
the optical path determining section is an acousto-optical modulator, and
the two optical paths are 0-order and 1-order optical paths of the acousto-optical modulator.

7. The laser beam output apparatus according to claim 1, wherein
the wavelength changing section is a PPLN.

8. The laser beam output apparatus according to claim 1, wherein
the wavelength changing section is an OPO or an OPG.

9. A laser beam output apparatus comprising:
a pulsed laser output section that outputs a laser beam having a predetermined wavelength as pulses;
an optical path determining section that receives the pulses and determines one or more among two or more optical paths for each of the pulses for output;
a parallelizing section that parallelizes the traveling direction of light beams traveling, respectively, through the two or more optical paths;
a wavelength changing section that receives outputs from the parallelizing section and, when the power of the outputs exceeds a threshold value, changes the wavelengths of the outputs for output;
a focusing section that receives and focuses outputs from the wavelength changing section; and
an optical fiber that receives an output from the focusing section at a core end face, wherein
the focusing section is arranged to focus the outputs from the wavelength changing section on the core end face, and
the optical path determining section is arranged to allow for change in the power ratio between a first power of the light beam traveling through one of two among the two or more optical paths and a second power of the light beam traveling through the other of the two optical paths, and
wherein the threshold value is defined for each of the optical paths.

10. The laser beam output apparatus according to claim 9, wherein
the optical path determining section is arranged such that:
the power of the light beam traveling through any one of the optical paths only exceeds the threshold value;
when the first power exceeds the threshold value, the power ratio is allowed to have two or more levels; and
when the second power also exceeds the threshold value, the power ratio is allowed to have two or more levels.

11. The laser beam output apparatus according to claim 9, wherein the optical path determining section comprises a power ratio change signal providing section that provides a power ratio change signal for changing the power ratio, and the optical path determining section is an acousto-optical modulator.

12. The laser beam output apparatus according to claim 11, wherein the power ratio change signal providing section has:

a carrier wave source that outputs a carrier wave;

a mixer that mixes the carrier wave and a voltage-variable modulation signal to output a modulated signal; and an amplitude changer that changes the amplitude of the modulated signal to output the power ratio change signal.

13. The laser beam output apparatus according to claim 11, further comprising an output measuring section that measures the output of the wavelength changing section, wherein the power ratio change signal providing section is arranged to change the magnitude of the power ratio change signal based on a result of measurement by the output measuring section.

14. The laser beam output apparatus according to claim 9, wherein the optical path determining section is an acousto-optical modulator, and the two optical paths are 0-order and 1-order optical paths of the acousto-optical modulator.

15. The laser beam output apparatus according to claim 9, wherein the wavelength changing section is a PPLN.

16. The laser beam output apparatus according to claim 9, wherein the wavelength changing section is an OPO or an OPG.

* * * * *